US012579229B2

(12) United States Patent
Starosta et al.

(10) Patent No.: US 12,579,229 B2
(45) Date of Patent: Mar. 17, 2026

(54) DNS VALIDATION TO AVOID INADVERTENT SUBZONE CREATION

(71) Applicant: Capital One Services, LLC, McLean, VA (US)

(72) Inventors: Seven Starosta, Brooklyn, NY (US); Jeffrey M. Tejnecky, Chesterfield, VA (US); Brandon Krouse, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 18/631,680

(22) Filed: Apr. 10, 2024

(65) Prior Publication Data

US 2025/0322045 A1     Oct. 16, 2025

(51) Int. Cl.
G06F 21/31     (2013.01)

(52) U.S. Cl.
CPC .................................... G06F 21/31 (2013.01)

(58) Field of Classification Search
CPC ........................................................ G06F 21/31
See application file for complete search history.

(56) References Cited

U.S. PATENT DOCUMENTS

| | | | | |
|---|---|---|---|---|
| 6,701,329 B1 * | 3/2004 | Esibov | ................ | H04L 61/5076 |
| 7,296,155 B1 * | 11/2007 | Trostle | ................ | H04L 63/1441 |
| | | | | 713/170 |
| 7,620,733 B1 * | 11/2009 | Tzakikario | .......... | H04L 63/1458 |
| | | | | 709/229 |

| | | | | |
|---|---|---|---|---|
| 7,680,876 B1 * | 3/2010 | Cioli | ................... | H04L 61/4511 |
| | | | | 709/201 |
| 7,748,047 B2 * | 6/2010 | O'Neill | ............... | H04L 63/0876 |
| | | | | 726/1 |
| 8,261,351 B1 * | 9/2012 | Thornewell | ......... | H04L 61/4511 |
| | | | | 713/153 |
| 8,285,830 B1 * | 10/2012 | Stout | ................... | H04L 63/1441 |
| | | | | 709/224 |

(Continued)

OTHER PUBLICATIONS

What is Airflow™?, < https://airflow.apache.org/docs/apache-airflow/stable/>>, publication date unknown but, prior to May 29, 2022, 5 pages.
DAGs, Apache Airflow, date of publication unknown but, <<https://airflow.apache.org/docs/apache-airflow/stable/concepts/dags.html>>, prior to Mar. 24, 2024, 27 pages.

(Continued)

*Primary Examiner* — Aravind K Moorthy
(74) *Attorney, Agent, or Firm* — Banner & Witcoff, Ltd.

(57)     ABSTRACT

Methods, systems, and apparatuses are described herein for management of a Domain Name System (DNS) system. The system comprises numerous improvements, many related to CNAME records of the DNS. A computing device may manage authentication for a DNS using shared authentication credentials of a first authentication framework. In this manner, a wide variety of users might authenticate themselves using a first framework and use authentication credentials for a second framework to access a DNS. The computing device may further protect DNS servers from Denial of Service (DoS) attacks by bifurcating read and write requests to a DNS to different servers, such that attacks on read requests do not affect all of the DNS. The computing device may further validate DNS requests using, for example, natural language processing to avoid typographical errors inadvertently creating DNS zones.

20 Claims, 10 Drawing Sheets

(56) References Cited

U.S. PATENT DOCUMENTS

| | | | | |
|---|---|---|---|---|
| 8,473,635 B1* | 6/2013 | Lohner | H04L 61/3025 | 709/218 |
| 8,799,639 B2 | 8/2014 | Balazs et al. | | |
| 8,886,747 B1* | 11/2014 | Chen | G06F 16/955 | 709/224 |
| 8,935,748 B2* | 1/2015 | Statia | G06F 16/951 | 713/168 |
| 9,143,494 B2* | 9/2015 | Giles | H04L 63/08 | |
| 9,239,911 B2 | 1/2016 | Duryee et al. | | |
| 9,372,688 B1* | 6/2016 | Ben-Yair | H04L 67/02 | |
| 9,491,135 B1* | 11/2016 | Earl | H04L 61/4511 | |
| 9,516,130 B1* | 12/2016 | Graham-Cumming | H04L 67/568 | |
| 9,705,959 B1 | 7/2017 | Strand et al. | | |
| 9,736,185 B1* | 8/2017 | Belamaric | H04L 63/20 | |
| 9,813,303 B1* | 11/2017 | Guigli | H04L 61/5014 | |
| 9,948,527 B1* | 4/2018 | Bryan | H04L 43/04 | |
| 10,009,443 B1* | 6/2018 | Guigli | H04L 47/783 | |
| 10,104,039 B1* | 10/2018 | Knecht | H04L 67/1017 | |
| 10,148,493 B1* | 12/2018 | Ennis, Jr. | G06F 9/541 | |
| 10,193,852 B2* | 1/2019 | Kommula | H04L 67/1012 | |
| 10,205,701 B1* | 2/2019 | Voss | H04L 67/02 | |
| 10,462,180 B1* | 10/2019 | Ben David | H04L 63/0823 | |
| 10,649,744 B1* | 5/2020 | Black | G06F 8/75 | |
| 10,904,273 B1* | 1/2021 | Mccarty | H04L 63/1416 | |
| 10,931,786 B1* | 2/2021 | Vasquez | H04L 41/0806 | |
| 11,153,265 B1* | 10/2021 | Fayed | H04L 61/5007 | |
| 11,218,326 B1* | 1/2022 | Eland | H04L 63/123 | |
| 11,394,540 B1* | 7/2022 | Larrew | H04L 61/4511 | |
| 11,516,253 B1* | 11/2022 | Van Deman, V | H04L 63/10 | |
| 11,777,992 B1* | 10/2023 | Cross | H04L 63/0876 | 726/5 |
| 11,818,055 B1* | 11/2023 | Lanoy | H04L 47/803 | |
| 11,882,117 B1* | 1/2024 | Kumar | H04L 63/0853 | |
| 11,902,242 B1* | 2/2024 | Larrew | H04L 61/4511 | |
| 11,997,065 B1* | 5/2024 | Monti | H04L 67/52 | |
| 12,095,734 B1* | 9/2024 | Engskow | H04L 63/0272 | |
| 12,289,289 B1* | 4/2025 | Deknecht | H04L 61/3025 | |
| 12,445,433 B1* | 10/2025 | Starosta | H04L 63/0435 | |
| 12,476,793 B2* | 11/2025 | Kumar | H04L 43/028 | |
| 2003/0079125 A1* | 4/2003 | Hope | H04L 9/3268 | 713/156 |
| 2004/0083306 A1 | 4/2004 | Gloe | | |
| 2005/0203875 A1 | 9/2005 | Mohammed et al. | | |
| 2006/0165060 A1* | 7/2006 | Dua | G06Q 20/322 | 705/76 |
| 2006/0248190 A1* | 11/2006 | Gardos | H04L 61/00 | 709/225 |
| 2007/0073660 A1 | 3/2007 | Quinlan | | |
| 2007/0253377 A1* | 11/2007 | Janneteau | H04L 61/4511 | 370/338 |
| 2008/0104182 A1* | 5/2008 | Jimmei | H04L 61/4511 | 709/206 |
| 2008/0114897 A1* | 5/2008 | Awadallah | H04L 61/4511 | 709/245 |
| 2008/0189437 A1* | 8/2008 | Halley | H04L 61/4552 | 709/245 |
| 2010/0031078 A1* | 2/2010 | Foote | H04L 67/1095 | 713/310 |
| 2010/0107215 A1* | 4/2010 | Bechtel | H04L 63/0209 | 726/1 |
| 2010/0174785 A1 | 7/2010 | Cai et al. | | |
| 2011/0078327 A1* | 3/2011 | Li | H04L 61/4511 | 709/245 |
| 2011/0225206 A1* | 9/2011 | Sureshchandra | H04L 61/4511 | 707/802 |
| 2011/0225263 A1* | 9/2011 | Sureshchandra | H04L 61/4511 | 709/217 |
| 2011/0283174 A1* | 11/2011 | M'Raihi | H04L 61/4511 | 715/205 |
| 2011/0283359 A1* | 11/2011 | Prince | G06Q 30/0241 | 726/23 |
| 2012/0066360 A1* | 3/2012 | Ghosh | H04L 43/106 | 709/223 |
| 2012/0079115 A1* | 3/2012 | Richardson | H04L 67/61 | 709/245 |
| 2012/0239731 A1* | 9/2012 | Shyamsunder | G06F 16/955 | 709/203 |
| 2013/0018944 A1* | 1/2013 | Shyamsunder | G06F 16/955 | 709/203 |
| 2013/0085914 A1* | 4/2013 | McPherson | H04L 63/0823 | 705/34 |
| 2014/0258346 A1* | 9/2014 | Meltzer | G06F 16/16 | 707/822 |
| 2014/0344663 A1* | 11/2014 | Joel | G06F 16/95 | 715/234 |
| 2015/0215276 A1* | 7/2015 | Bhagwat | H04L 61/5014 | 709/220 |
| 2015/0281168 A1* | 10/2015 | Holloway | H04L 61/4511 | 709/245 |
| 2015/0319097 A1* | 11/2015 | Hyatt | H04L 41/5054 | 709/224 |
| 2016/0021055 A1* | 1/2016 | Krzywonos | H04L 61/301 | 709/245 |
| 2016/0026796 A1* | 1/2016 | Monrose | H04L 63/1441 | 726/24 |
| 2016/0028847 A1* | 1/2016 | Bradshaw | H04L 61/58 | 709/213 |
| 2016/0197898 A1* | 7/2016 | Hozza | H04L 63/1466 | 713/168 |
| 2016/0262021 A1 | 9/2016 | Lee et al. | | |
| 2016/0352840 A1* | 12/2016 | Negron | H04L 63/083 | |
| 2016/0381048 A1 | 12/2016 | Zhao et al. | | |
| 2017/0041321 A1 | 2/2017 | Tan et al. | | |
| 2017/0048186 A1* | 2/2017 | Blinn | H04L 61/4552 | |
| 2017/0099341 A1* | 4/2017 | Joe | H04L 67/02 | |
| 2017/0279617 A1* | 9/2017 | Blinn | H04L 63/06 | |
| 2017/0279792 A1* | 9/2017 | Tse | H04L 63/062 | |
| 2017/0302699 A1 | 10/2017 | Adams et al. | | |
| 2017/0310636 A1* | 10/2017 | Jheeta | H04L 61/4511 | |
| 2017/0339222 A1* | 11/2017 | Newton | H04L 67/568 | |
| 2017/0359447 A1* | 12/2017 | Chan | H04L 45/742 | |
| 2018/0048673 A1* | 2/2018 | Hunt | H04L 63/08 | |
| 2018/0213052 A1 | 7/2018 | MacCarthaigh et al. | | |
| 2018/0219912 A1* | 8/2018 | Maslak | H04L 63/1441 | |
| 2018/0278471 A1* | 9/2018 | Burli | G06F 9/451 | |
| 2018/0285170 A1* | 10/2018 | Gamon | G06N 7/01 | |
| 2018/0324137 A1* | 11/2018 | Tuliani | H04L 61/4511 | |
| 2018/0343122 A1* | 11/2018 | Spacek | H04L 9/3247 | |
| 2018/0375716 A1* | 12/2018 | Huque | H04L 61/4511 | |
| 2019/0044940 A1* | 2/2019 | Khalil | H04L 9/3247 | |
| 2019/0104103 A1* | 4/2019 | Newton | H04L 67/1031 | |
| 2019/0116153 A1* | 4/2019 | Deverakonda Venkata | H04L 9/3268 | |
| 2019/0130100 A1 | 5/2019 | Dymshits et al. | | |
| 2019/0132280 A1* | 5/2019 | Meuninck | H04L 45/50 | |
| 2019/0207927 A1 | 7/2019 | Lakhani et al. | | |
| 2019/0238498 A1* | 8/2019 | Cleary | H04L 63/08 | |
| 2019/0245875 A1 | 8/2019 | Chen et al. | | |
| 2019/0306110 A1* | 10/2019 | Davis | H04L 63/068 | |
| 2020/0007548 A1 | 1/2020 | Sanghavi et al. | | |
| 2020/0073944 A1* | 3/2020 | Mishra | G06F 40/247 | |
| 2020/0134102 A1* | 4/2020 | Yoneuchi | H04L 67/02 | |
| 2020/0137138 A1* | 4/2020 | Rice | H04L 61/4511 | |
| 2020/0220946 A1 | 7/2020 | Chan et al. | | |
| 2021/0203671 A1 | 7/2021 | Baldwin et al. | | |
| 2021/0289001 A1* | 9/2021 | Wilson | H04L 63/101 | |
| 2022/0006772 A1* | 1/2022 | Eland | H04L 9/0891 | |
| 2022/0021639 A1* | 1/2022 | Eland | H04L 61/4511 | |
| 2022/0038544 A1* | 2/2022 | Grinstein | H04L 63/10 | |
| 2022/0094661 A1* | 3/2022 | Woodworth | H04L 63/1441 | |
| 2022/0200976 A1* | 6/2022 | Lam | H04L 63/164 | |
| 2022/0210147 A1* | 6/2022 | Galvin | H04L 63/0823 | |
| 2022/0286431 A1* | 9/2022 | Winn | H04L 61/4511 | |
| 2022/0321596 A1* | 10/2022 | Weizman | H04L 61/4511 | |
| 2022/0337654 A1* | 10/2022 | Koenig | H04L 67/561 | |
| 2023/0156044 A1* | 5/2023 | St. Pierre | H04L 61/4511 | 726/3 |
| 2023/0231870 A1* | 7/2023 | St. Pierre | H04L 63/1458 | 726/22 |

(56) References Cited

U.S. PATENT DOCUMENTS

| | | | |
|---|---|---|---|
| 2023/0269269 A1* | 8/2023 | Bjarnason | H04L 63/1416 |
| | | | 726/22 |
| 2023/0362207 A1 | 11/2023 | St. Pierre et al. | |
| 2024/0095733 A1* | 3/2024 | Gauvreau, Jr. | G06Q 20/389 |
| 2024/0119133 A1* | 4/2024 | Mohan | G06F 21/33 |
| 2024/0176829 A1 | 5/2024 | Vilcinskas et al. | |
| 2024/0195781 A1* | 6/2024 | Wertkin | H04L 63/10 |
| 2025/0047687 A1* | 2/2025 | Duan | H04L 61/4511 |
| 2025/0071111 A1* | 2/2025 | Parla | H04L 63/0236 |
| 2025/0088531 A1 | 3/2025 | St. Pierre et al. | |
| 2025/0110816 A1* | 4/2025 | Kfir | G06F 9/547 |
| 2025/0211563 A1* | 6/2025 | Raghunath | H04L 61/4511 |
| 2025/0322045 A1* | 10/2025 | Starosta | G06F 21/31 |
| 2025/0323973 A1* | 10/2025 | Starosta | H04L 67/1038 |

OTHER PUBLICATIONS

Xu, Tony, "Step by Step: build a data pipeline with Airflow," Towards Data Science, Aug. 15, 2020, <<https://towardsdatascience.com/step-by-step-build-a-data-pipeline-with-airflow-4f96854f7466>>, 35 pages.

Apache Airflow, "How to Work with Databases—ETL Pipeline," better data science, date of publication unknown but, prior to Feb. 17, 2022, <<https://betterdatascience.com/apache-airflow-postgres-database/>>, 31 pages.

Access the Airflow database, <<https://docs.astronomer.io/software/access-airflow-database>>, date of publication unknown but, prior to May 7, 2020, 10 pages.

Understanding the Airflow metadata database, <<https://www.astronomer.io/guides/airflow-database>>, date of publication unknown but, prior to Apr. 18, 2022, 8 pages.

* cited by examiner

200

300

400

| Record | Hostname | Value | Comment | |
|--------|----------|-------|---------|---|
| A | companyname.com | 192.168.1.1 | | ⌐ 601 |
| A | internal.companyname.com | 192.168.1.2 | User01<br>2004-09-17T00:00:00.00 | ⌐ 602 |
| CNAME | www.companyname.net | www.companyname.com | User01<br>2004-09-17T00:00:00.04 | ⌐ 603 |
| CNAME | internal.companyname.net | internal.companyname.com | User02<br>2004-09-17T00:00:01.25 | ⌐ 604 |
| NS | companyname.net | nameserver.companyname.<br>com | User01<br>2004-09-17T00:00:02.41 | ⌐ 605 |

```
{"info": {
    "_postman_id": "9677d6b9-b87c-4b82-ae09-8b8612d086b4",
    "name": "CNAME PROD",
    "schema": "https://schema.getpostman.com/json/collection/v2.1.0/collection.json"
},
"item": [
    {
      "name": "Create",
      "request": {
        "method": "POST",
        "header": [
          {
            "key": "Accept",
            "value": "application/json;v=2"
          },
          {
            "key": "Authorization",
            "value": "Bearer {{token}}"
          },
          {
            "key": "Content-Type",
            "value": "application/json"
          }     ],
        "body": {
          "mode": "raw",
          "raw": "{\n\t\"host\": \"{{host}}\", \n\t\"cname\": \"{{cname}}\",\n\t\"timeToLive\": \"300\",\n\t\
"asvName\" : \"{{asvName}}\"\n}"
        },
        "url": {
          "raw": "https://api.cloud.company.com/internal-operations/dns-management/cnames",
          "protocol": "https",
          "host": [
            "api",
            "cloud",
            "capitalone",
            "com"
          ],
          "path": [
            "internal-operations",
            "dns-management",
            "cnames"
          ]
        }
      },
      "response": [] } ]}
```

FIG. 9

DNS VALIDATION TO AVOID
INADVERTENT SUBZONE CREATION

The following applications are related and each is expressly incorporated herein by reference for all purposes:
1. U.S. patent application Ser. No. 18/631,620, entitled "SHARED AUTHENTICATION VIA DNS REQUEST ROUTING", filed herewith;
2. U.S. patent application Ser. No. 18/631,652, entitled "DNS LOAD BALANCING VIA REQUEST ROUTING", filed herewith; and
3. U.S. patent application Ser. No. 18/631,680, entitled "DNS VALIDATION TO AVOID INADVERTENT SUBZONE CREATION", filed herewith.

FIELD OF USE

Aspects of the disclosure relate generally to management of a Domain Name System (DNS). More specifically, aspects of the disclosure may provide for improvements to the handling of DNS requests, particularly those involving Canonical Name (CNAME) records, in a manner that, among other things, protects against Denial of Service (DoS) attacks against authoritative DNS servers, simplifies the authoritative DNS server authentication process for large quantities of users, and avoids user error during modification of DNS records.

BACKGROUND

Domain name systems are analogous to phonebooks of the Internet, and map domain names (e.g., companyname-.com) to Internet Protocol (IP) addresses (e.g., 192.168.1.1). There are two types of DNS servers—enterprises may use authoritative DNS servers to manage the configuration of their DNS records. Computers and applications may perform read-only DNS queries against recursive DNS servers (aka DNS resolvers) to receive information on DNS records. For example, when a user types "companyname.com" into an address bar of their web browser, a DNS resolver may query a database of DNS records to identify a corresponding IP address (in this example, 192.168.1.1) and route the web browser to that IP address. In this manner, users can access networked resources using memorable domain names, rather than strings of numbers or other difficult-to-remember strings.

There are a variety of types of DNS records. An A record is used to map a domain name to one or more IP addresses, such as an IP address of a server. In contrast, a CNAME record maps one domain name (e.g., www.company-name.com) to another domain name (landingpage.compa-nyname.com). Relatedly, an ALIAS record maps one domain name to another, albeit in a slightly different manner (e.g., in a manner that uses an authoritative server differently).

Large enterprises can maintain large quantities of DNS records, making management of those records prohibitively difficult. For example, hundreds of different employees of a large enterprise (e.g., programmers at an organization that manage various APIs of the organization) might need to regularly modify DNS records. This can be technologically difficult: authentication of those users with the authoritative DNS servers can be cumbersome, and mistakes made by such employees could cause inadvertent trouble (e.g., because a typographical error could inadvertently create new DNS zones, creating a relatively fragmented set of DNS records).

Worse still, organizations are almost always at risk of a DoS attack or intentional overloading on their authoritative DNS servers by internal users. For example, internal users of an authoritative DNS server may perform excessive read API calls against the primary authoritative DNS server, causing outage.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to use of common authentication credentials for a DNS Application Programming Interface (API). Specifically, a computing device may be configured to manage authentication for an authoritative DNS using shared authentication credentials of a particular authentication framework. In this manner, a wide variety of stakeholders might use their own authentication credentials on a different framework to entitle themselves to use of the shared authentication credentials of the particular authentication framework. As will be detailed below, one benefit of this approach is that complex, multi-user authentication can be offloaded from servers providing DNS services, allowing for a large quantity of users to access and modify records (e.g., CNAME records) of an authoritative DNS without burdening the authoritative DNS with separate authentication requests.

More particularly, a computing device may receive, via an Application Programming Interface (API), a first DNS request comprising first authentication credentials for a first user and a first requested change to a first DNS Canonical Name (CNAME) record. For example, the request may comprise a request to create a CNAME record. The computing device may query a first authentication database corresponding to the first authentication framework to determine whether the first authentication credentials are associated with a known identifier in a first authentication protocol (e.g. OAuth). Such existing authentication identifiers may have been generated in accordance with the first authentication framework upon successful authentication of one or more users. The first authentication credentials may be compared to a blocklist by the computing device, and the request rejected if the identifier is found. The computing device may then, based on determining that the computing device has no valid authentication token for the authoritative DNS server, query a second authentication database (e.g. Hashicorp vault) to acquire credentials corresponding to a second authentication framework (e.g. SAML), for use with the second authentication framework with the authoritative DNS server. Based on a determination that the first authentication credentials are valid, the computing device may generate a modified DNS request comprising the first requested change to the first DNS CNAME record and the shared authentication credentials of the second authentication framework. The computing device may then transmit the modified DNS request to an authoritative DNS server. The computing device may then receive, from the authoritative DNS server, a response to the modified DNS request, modify the response to the modified DNS request by removing, from the response, one or more indications of the shared authentication credentials, enrich the response with additional metadata possibly including but not limited to a non-sensitive owner identifier of the DNS record requested, and then send the modified response to a user device.

In such a circumstance, users might also have credentials for a DNS management platform, and may be able to thereby avoid use of shared credentials. For example, the computing device may receive, via the API, a second DNS request comprising second authentication credentials for a second user and a second requested change to a second DNS CNAME record. The computing device may query the first authentication database corresponding to the first authentication framework to determine whether the second authentication credentials are associated with the one or more existing authentication tokens. Based on a determination that the second authentication credentials are associated with a first authentication token of the one or more existing authentication tokens, the computing device may then determine, based on the first authentication token, a secret key and generate a second modified DNS request comprising the second requested change to the second DNS CNAME record, the first authentication token, and the secret key. The computing device may then transmit the second modified DNS request to the DNS server.

The process described herein also advantageously allows for better per-user management of DNS records. Per-user/application ownership of various DNS records can ensure that users are limited in their ability to affect changes on DNS records, thereby improving security. This is particularly important for large organizations managing large quantities of DNS records.

Moreover, in such a system, requests may be denied where authentication fails. A computing device may receive, via the API, a second DNS request comprising second authentication credentials for a second user and a second requested change to a second DNS CNAME record. The computing device may then query the first authentication database corresponding to the first authentication framework to determine whether the second authentication credentials are associated with a known identifier. Based on determining that the second authentication credentials are not associated with a known identifier, and the computing device may cause output of a notification that the second DNS request is denied.

Aspects described herein also relate to load balancing for a DNS Ownership Intermediary API in a manner that protects authoritative DNS servers from DoS attacks, such as attacks on DNS resolvers and/or DNS nameservers. A first authoritative DNS server (primary) in an organization may be configured to manage DNS write requests, whereas a different authoritative DNS server (secondary) in the organization may be configured to manage authoritative DNS read requests. Each server might maintain a copy of DNS records. The first authoritative DNS server might accept and process changes to DNS records, and the different authoritative DNS server might store (e.g., cache) such records on a periodic basis. As a result, DoS attacks (e.g., write attacks, read attacks) are limited to one server (a centralized server hardened against such attacks), and a DoS attack cannot take down various DNS servers of an organization (e.g., the actual DNS resolvers and/or DNS nameservers protected by the centralized servers)).

More particularly, a system may be configured to protect Domain Name System (DNS) servers from Denial of Service (DoS) attacks or other excessive API calls to authoritative DNS servers. That system may comprise a computing device, a first authoritative DNS server (primary), and a second authoritative DNS server (secondary). The computing device may be configured to receive, via an Application Programming Interface (API), a first DNS request, and, based on determining that the first DNS request comprises a requested change to a first DNS record, route the first DNS request to the first authoritative DNS server. That first DNS request might comprise, for example, a request to create a CNAME record. That first DNS request may comprise authentication credentials, and the computing device may be configured to route the first DNS request to the first (primary or write) authoritative DNS server further based on validating the authentication credentials and validity of the content of the first DNS request. The computing device may also be configured to receive, via the API, a second DNS request and, based on determining that the second DNS request comprises a read request associated with the first DNS record, route the second DNS request to the second (secondary or read) authoritative DNS server. The second DNS request may comprise authentication credentials, and the computing device may be configured to route the second DNS request to the second DNS server further based on validating the authentication credentials and validity of the content of the request. The first authoritative DNS server may be configured to receive the first DNS request and transmit (replicate) the modified DNS record to the second authoritative DNS server. The first authoritative DNS server may be configured to maintain a first copy of DNS records and the second authoritative DNS server may be configured to maintain a second copy of the DNS records, such that the first authoritative DNS server is configured to transmit (replicate) the modified DNS record to the second authoritative DNS server as part of an update to the second copy of the DNS records. The second DNS server may be configured to store the modified DNS record, receive the second DNS request, and provide, in response to the second DNS request, the modified DNS record.

The computing device may be configured to implement a DNS request blocklist and/or time limit process, which may aid in protection from DoS attacks. Such a DNS request blocklist could block DNS requests associated with particular records, DNS requests from particular users, or the like. For example, the computing device may receive, via the API, a second DNS request. In turn, based on determining that the second DNS request is associated with a user identifier on a blocklist, the computing device may cause display, on a user device, of a notification indicating that the second DNS request is denied. As another example, the computing device may receive, via the API, a second DNS request. Based on a quantity of DNS requests received during a predetermined time period satisfying a threshold, the computing device may cause display, on a user device, of a notification indicating that the second DNS request is denied.

Aspects described herein also relate to preventing user error from creating new DNS subzones by configuring a DNS Ownership Intermediary API to process DNS requests to identify typographical errors. A user might submit a request to create a CNAME record, but that request may comprise a typographical error, such as the inadvertent inclusion of an asterisk or the mis-typing of a word. Such a typographical error can inadvertently create new DNS zones, which—particularly for a large organization—can quickly cause unnecessary complexity and redundancy that slows down DNS servers. To avoid this process, where such a request does not correspond to any existing DNS subzones, aspects described herein process the request to identify potential typographical errors and, where possible, prompt users to remediate those errors.

More particularly, a computing device may receive, via an Application Programming Interface (API), a first request to create a DNS Canonical Name (CNAME) record. That first request may comprise first authentication credentials corresponding to a first user. The first authentication credentials may comprise a first user identifier and an identification of a requested DNS subzone. Based on determining that the identification of the requested DNS record's subzone corresponds to an existing DNS subzone, based on validating the first authentication credentials, and based on determining that an existing DNS CNAME record corresponding to the existing DNS subzone comprises the first user identifier, the computing device may transmit the first request to an authoritative DNS server. The computing device may then receive, via the API, a second request to create a DNS CNAME record. The second request may comprise a second user credentials and a second identification of the requested DNS record's subzone. Based on determining that the second identification of the requested DNS record's subzone does not correspond to any existing DNS subzones, the computing device may identify a typographical error in the second identification by processing, using a regular expression, or by searching within an authoritative DNS server and cause, based on the typographical error, display, in a user interface, of a recommended modification to the second request. The recommended modification may comprise a recommendation to modify one or more characters of the identification of a requested DNS subzone. The computing device may receive, via the API, a third request to create a DNS CNAME record. That third request may comprise third authentication credentials corresponding to a second user and a third identification of the requested DNS record's subzone. The third authentication credentials may comprise a third user identifier. Based on determining that the requested DNS record's subzone corresponds to an existing DNS subzone, based on validating the third authentication credentials, and based on determining that the third user identifier is not indicated in any DNS records associated with the existing DNS subzone, the computing device may cause display, in the user interface, of an indication that the third request to create the DNS CNAME record is denied.

The computing device may be configured to modify aspects of the first request. For example, the first request may comprise a timeToLive value as an integer in seconds determining how long DNS servers will cache the DNS record of the first request, and the computing device may transmit the first request to the authoritative DNS server by modifying the timeToLive value, optionally based on the requested DNS record's subzone of the requested canonical name (target fully qualified domain name to be aliased by the CNAME record of the first request) of the CNAME record, a higher time-to-live value, as enforced by the computing device, may offer cost and performance benefits for DNS read queries to recursive DNS servers, and may provide protection against outages of authoritative DNS servers or recursive DNS servers. As another example, the computing device may add, to a comment field of the first request, an indication of the first user identifier, the presence of a user identifier in the comment field of the first DNS record within the authoritative DNS server(s) may form the basis for determining the permissions of users to perform update requests on the first DNS record, the protection of DNS records on an individual DNS record basis by the computing device, as opposed to protection on a DNS zone basis by the authoritative DNS server or by the computing device, allows for many users or computer systems within an enterprise to manage DNS records within a single DNS zone through the computing device in a secure and distributed manner. As yet another example, the computing device may add, to a comment field of the first request, a timestamp corresponding to a time when the computing device received the first request.

The computing device may determine that the requested DNS record's subzone corresponds to an existing DNS subzone in a variety of ways. For example, the computing device may validate a format of the identification of the requested DNS record's subzone.

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts examples of DNS records.

FIG. 9 is an example of a schema which might be used as part of communications involving a DNS Ownership Intermediary API server.

DETAILED DESCRIPTION

Figure 1:
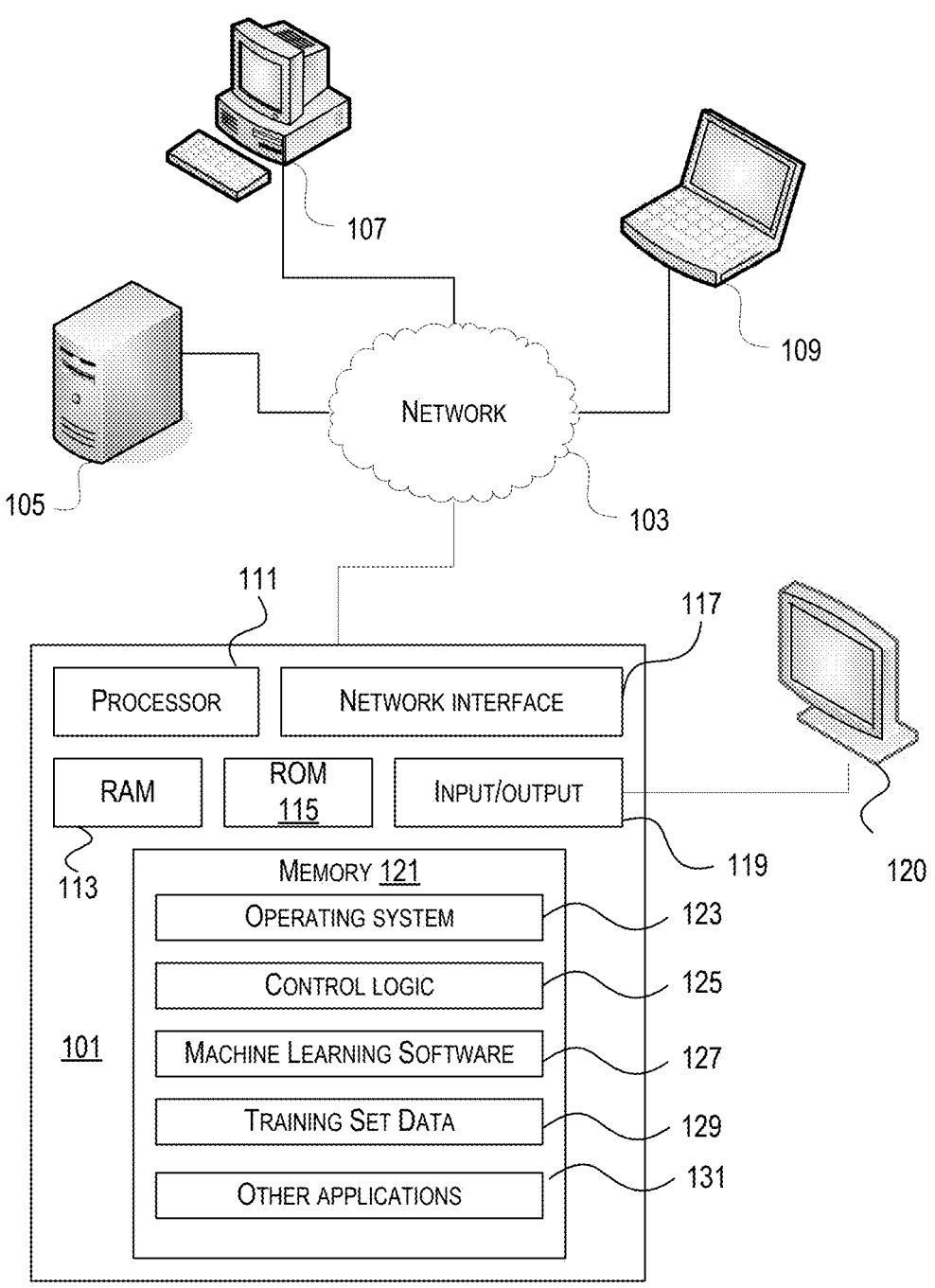
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described herein relate to a DNS Ownership Intermediary API that improves the overall performance and security of a DNS system, particularly for DNS implementations with large quantities of DNS records, with large quantities of users, DNS implementations spanning multiple enterprises or public cloud computing providers, and/or in circumstances where DoS attacks are of a concern. This particular configuration has a number of different improvements over conventional DNS systems. For example, by selectively using shared DNS credentials for authoritative DNS servers and by authenticating users using a separate authentication framework, the burden on an authentication system can be lightened, improving speed (and, in some cases, improving security, particularly where the separate authentication framework is more robust). As another example, by load balancing DNS requests across separate read/write authoritative DNS servers, organizations managing large quantities of DNS records can not only mitigate the harm of DoS attacks or accidental excessive DNS requests when they occur, but those organizations can also implement more sophisticated protections against such DoS attacks in the first place (by, for example, never allowing malicious/excess DNS requests to reach authoritative DNS servers in the first place). As yet another example, by validating DNS requests, the system can avoid the inadvertent creation of DNS zones that result from (for example) innocent typographical errors made by users. The net result is a significantly more secure and easier-to-use DNS system for large organizations.

As an example of how the present disclosure may operate in view of all three of the improvements above, an employee of a company that manages a large quantity of DNS records may wish to create a DNS record, such as a CNAME record. The employee may submit a DNS request to create a DNS CNAME record along with their authentication credentials for a central authentication system (that is, one different than an authentication system used by one or more DNS servers). Based on determining that the authentication credentials correspond to valid credential for the central authentication system (and not the authentication system used by the one or more DNS servers), the system may combine the request to create the DNS CNAME record along with shared authentication credentials for the authentication system used by the one or more DNS servers, in effect vouching for the employee. Notwithstanding the authentication, it is possible that the employee's request might contain a typographical error. The DNS Ownership Intermediary API described herein might detect such a possibility by, for example, determining that a requested subzone associated with the employee's request does not correspond to any existing DNS subzones, and by using natural language processing or a regular expression to identify the nature of the typographical error. In such a circumstance, the system might determine a typographical error in the request and prompt the employee to correct the error. Then, the employee's request (once corrected), by virtue of being (for example) a request to modify a DNS record, might be routed to an authoritative DNS server specially tasked with handling write requests (and, e.g., not read requests). Once one or more DNS records are created/modified based on the employee's request, the updated DNS records might then be reflected on a different DNS server specially tasked with handling read requests.

One advantage of the present disclosure is that it may be configured to implement the concept of least privilege in the context of the DNS. Generally, present companies might try to implement the concept of least privilege by limiting DNS access to a small number of individuals, such as a small team of engineers within a company. That said, this process can be costly (e.g., because a specific team must be hired and managed), and be difficult and time-consuming (e.g., because requests must be routed through a particular team), because the process might introduce delays, because a small number of users might have a dangerously broad amount of access to DNS records, because those users might introduce manual errors to the process, and/or because the process might be difficult to audit if mistakes are made. Other companies might try to create a multitude of DNS subzones and apportion responsibility out to different teams; however, this process also has limitations: it can be difficult to manage the process of application/software lifecycle management (e.g., because multiple teams might be responsible for the same application, because changes in the software might counsel for unnecessary changes to the DNS), the process might require significant overhead, and/or because permissions for certain zones might need to be hardcoded. Some other companies might instead try to be flexible with the above approach by giving multiple teams access to multiple zones; however, this process does not implement a least privilege approach, can make tracking responsibility for DNS records difficult, and can make auditing difficult. In contrast to the above three approaches, the present disclosure permits ownership tracking, maintains the principle of least privilege across the DNS system, and generally allows for better auditing, tracking, and flexibility in the system. The advantages of such an approach, as will be described below, include lowering the costs and complexities of managing a large number of zones, allowing a wide variety of teams to handle DNS requests without necessarily doing so in an overbroad way, avoids the need for engineers to ask other teams to create/edit/remove DNS records, lowers the security impact of circumstances where individual user accounts are compromised, and the like. Even from a relatively straightforward perspective, the present disclosure advantageously improves the process of managing the lifecycle of applications: for example, aspects described herein might require that all of a first application's DNS records are deleted and/or otherwise transferred to a second application before the first application can be decommissioned.

Aspects described herein improve the functioning of computers by improving domain name systems and, in particular, the performance and security of those systems. The DNS is in many ways inherent to computers and integral to the ways in which computers network together in a user-friendly way. That said, as indicated above, DNS servers are often subject to DoS attack, and organizations managing large DNS record sets often find that those sets are slow, cumbersome, and prohibitively difficult to manage. The aspects described herein improve the process of computer authentication for DNS requests, prevent those DNS requests from including mistakes that cause the inadvertent generation of DNS zones, distribute ownership of DNS records to user identifiers to reduce risk of malicious or unintentional update or deletion requests and to improve auditability of DNS records, proactively prevent certain DNS subdomain takeover attacks, and structure the overall DNS request process in a manner that protects authoritative DNS servers records from DoS attack and unintentional overload. In turn, the processes described herein are fundamentally rooted in computers and computer networking, could not be performed by human beings, and operate to improve the functioning of computers by improving the manner with which computer networking is performed.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
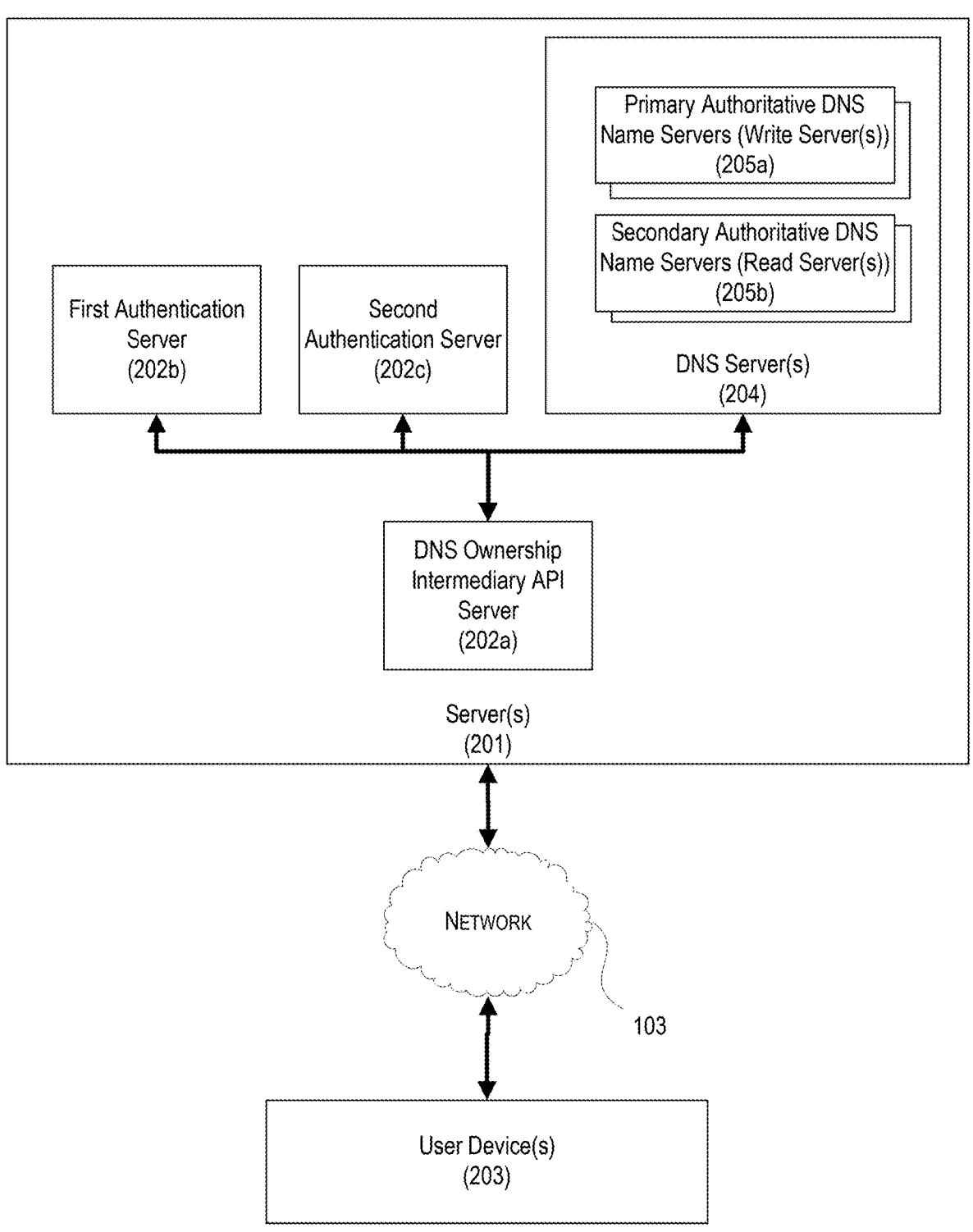
FIG. 2 depicts a system comprising servers and user devices.

FIG. 2 depicts a system 200 comprising one or more servers 201 (that include a DNS Ownership Intermediary API server 202a, a first authentication server 202b, a second authentication server 202c, and DNS servers 204 that include one or more primary authoritative DNS name servers (write servers) 205a and one or more secondary authoritative DNS name servers (read servers) 205b communicatively coupled, via the network 103, to one or more user devices 203. The one or more servers 201 and/or the one or more user devices 203 may comprise computing devices, such as computing devices that comprise one or more processors and memory storing instructions that, when executed on the one or more processors, cause the performance of one or more steps. The one or more servers 201 and/or the one or more user devices 203 may comprise any of the devices depicted with respect to FIG. 1, such as one or more of the computing devices 101, 105, 107, and/or 109.

The DNS Ownership Intermediary API server 202a may be configured to receive and manage DNS requests, such as requests to create, modify, and/or delete CNAME records. For example, the DNS Ownership Intermediary API server 202a may be configured to receive, from the user devices 203, a request to read one or more DNS records and route such a request to the one or more secondary authoritative DNS name servers (read servers) 205b. As another example, the DNS Ownership Intermediary API server 202a may be configured to receive, from the user devices 203, a request to modify (e.g., write) one or more DNS records and route such a request to the one or more primary authoritative DNS name servers (write servers) 205a. As another example, upon receipt of a DNS request, the DNS Ownership Intermediary API server 202a may be configured to validate authentication credentials in the request with the first authentication server 202*b* and then replace those authentication credentials with shared authentication credentials corresponding to the second authentication server 202*c* before sending the DNS request to one or more of the DNS servers 204. As another example, the DNS Ownership Intermediary API server 202*a* may be configured to, in response to determining that a requested DNS subzone indicated in a DNS request does not correspond to any existing DNS subzones, determine whether a typographical error exists in the DNS request and—if so—cause the one or more user devices 203 to display a recommendation to modify the request. The DNS Ownership Intermediary API server 202*a* may be configured to perform any other steps, as will be described in further detail below. Data stored and/or transmitted by the DNS Ownership Intermediary API server 202*a* may be in the form of Infoblox and/or in the JSON format.

The first authentication server 202*b* and the second authentication server 202*c* may be configured to manage different authentication frameworks. For example, the first authentication server 202*b* may implement the OAuth authentication framework, whereas the second authentication server 202*c* may implement the SAML authentication framework. Moreover, each authentication server might be used for different purposes. For example, the first authentication server 202*b* may be configured to manage authentication for employees of an organization (e.g., as part of a Single Sign On (SSO) process), whereas the second authentication server 202*c* may be configured to manage authentication server for the authoritative DNS servers 204. Either server may be configured to receive authentication credentials (e.g., a username, password, token) and indicate whether such authentication credentials are valid. To perform such a process, either server might query a database to identify whether the authentication credentials are valid.

The authoritative DNS servers 204 may comprise one or more servers that operate to provide a DNS. Such servers may be configured to resolve DNS queries and/or modify one or more DNS records by, in response to a request, add a DNS record, modify a DNS record, delete a DNS record, or the like. For example, the DNS servers 204 may be configured to receive a request to create a CNAME record and create such a record. DNS records may be stored by all or portions of the DNS servers 204. For example, the one or more primary authoritative DNS name servers (write servers) 205*a* and the one or more secondary authoritative DNS name servers (read servers) 205*b* may be configured to each store a different copy of DNS records, with updates to the DNS records of the one or more primary authoritative DNS name servers (write servers) 205*a* causing modification of the DNS records stored by the one or more secondary authoritative DNS name servers (read servers) 205*b* (e.g., through updates on a periodic basis).

The one or more user devices 203 may comprise laptops, desktop computers, smartphones, tablets, and/or similar devices which might be used by users (e.g., employees of a company) to send DNS requests and/or receive responses to DNS requests. For example, the one or more user devices 203 may execute web browsers which, when used by a user, send DNS requests associated with a user requesting access to a domain name. As another example, the one or more user devices 203 may output a user interface which permits users to modify DNS records by sending DNS requests, via the DNS Ownership Intermediary API server 202*a*, to the DNS servers 204.

The DNS Ownership Intermediary API server 202*a* may manage DNS requests from the one or more user devices

203 and route those requests based on certain conditions. For example, DNS read requests intended to get authoritative information from the management API of an authoritative DNS server (e.g., read requests destined for the one or more secondary authoritative DNS name servers (read servers) 205*b*, such as those which might be generated by a web browser) may be routed, via the DNS Ownership Intermediary API server 202*a*, to the one or more secondary authoritative DNS name servers (read servers) 205*b*, thereby reducing computational load on write servers 205*a*. In contrast, DNS write requests (e.g., write requests generated via a user interface as part of an employee's management of DNS records) might be routed, via the DNS Ownership Intermediary API server 202*a*, to the one or more primary authoritative DNS name servers (write servers) 205*a*. In either case, routing (particularly in cases of requests routed to the one or more primary authoritative DNS name servers (write servers) 205*a*) might be conditioned on authentication by the first authentication server 202*b* and/or the second authentication server 202*c*. For instance, such routing might be conditioned on authentication with a first authentication framework implemented by the first authentication server 202*b* such that the authentication credentials of a request can be replaced by shared credentials associated with a second authentication framework implemented by the second authentication server 202*c*. Moreover, such routing might be conditioned on verification of all or portions of the request. For example, in the event that a DNS request indicates a requested subzone that does not correspond to any existing subzones, the DNS Ownership Intermediary API server 202*a* may be configured to determine one or more typographical errors in the request and cause display, via a user interface of the one or more user devices 203, of a recommendation for the user to modify their request.

Discussion will now turn to one of the many advantages of the disclosure: the ability for the DNS Ownership Intermediary API system to use shared authentication credentials to essentially vouch for DNS requests containing valid authentication credentials that might not necessarily be for the correct framework or might not have direct access for an authoritative DNS server. This process might serve to simplify the authentication process with DNS servers 204 and lower the overall burden of authentication on the DNS servers 204.

Figure 3:
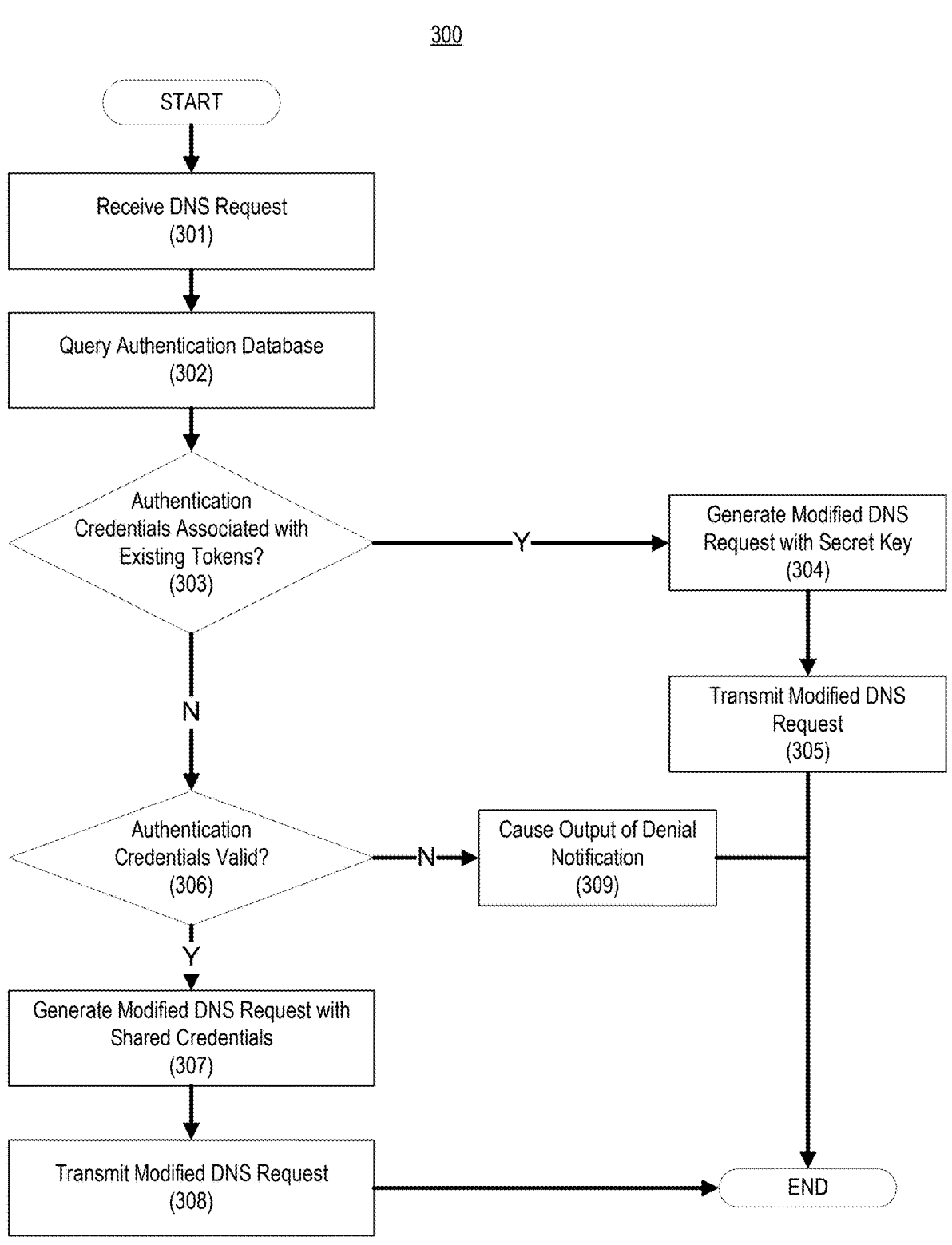
FIG. 3 depicts a flow chart comprising steps which may be performed to manage authentication for a DNS using shared authentication credentials of a first authentication framework.

FIG. 3 depicts a flow chart depicting a method 300 comprising steps which may be performed by a computing device, such as the DNS Ownership Intermediary API server 202*a* of FIG. 2. A computing device may comprise one or more processors and memory storing instructions that, when executed by the one or more processors, cause performance of one or more of the steps of FIG. 3. One or more non-transitory computer-readable media may store instructions that, when executed by one or more processors of a computing device, cause the computing device to perform one or more of the steps of FIG. 3. Additionally and/or alternatively, one or more of the devices depicted in FIG. 2, such as the one or more servers 201 and/or the one or more user devices 203, may be configured to perform one or more of the steps of FIG. 3. Moreover, all or portions of the steps of FIG. 3 may be the same or similar as the elements and concepts depicted with respect to FIG. 2. For simplicity, the steps below will be described as being performed by a single computing device; however, this is merely for simplicity, and any of the below-referenced steps may be performed by a wide variety of computing devices, including multiple computing devices.

In step 301, the computing device may receive a DNS request. A DNS request may comprise a request to access a DNS record (e.g., a DNS query), a request to modify a DNS record (e.g., to delete, edit, and/or otherwise alter an existing DNS record), a request to add a DNS record, or the like. For instance, the request may comprise a request to create a CNAME record. Such requests might be received via an API and might contain data associated with a user. For example, the computing device may receive, via an Application Programming Interface (API), a first DNS request comprising first authentication credentials for a first user and a first requested change to a first DNS Canonical Name (CNAME) record. In such an example, the first requested change to the first DNS CNAME record may comprise a request to create a CNAME record.

DNS requests may comprise any request to read or modify records. In some circumstances, the DNS requests might not necessarily comprise queries/requests against nameservers. For instance, the DNS requests may be specifically directed to the DNS Ownership Intermediary API server 202a.

In step 302, the computing device may query an authentication database. This step may be performed to access credentials for a system account associated with one or more authoritative DNS servers 204. Such a step may be performed to authenticate a user with one or more authoritative DNS servers 204 and/or to authenticate a user based on authentication credentials provided via the DNS request received in step 301. In some circumstances, this step may include determining whether a user and/or a particular account has already been authenticated by querying a database to identify one or more tokens that might have been generated for a user and/or system account as part of an authentication process with a particular authentication framework. For example, the computing device may query a first authentication database corresponding to the first authentication framework to determine whether the first authentication credentials are associated with one or more existing authentication tokens. In some cases, the first authentication credentials might themselves comprise one or more tokens, such that step 302 might comprise checking to see if a candidate token (provided via a DNS request) corresponds to a stored token.

The one or more authentication tokens may comprise any data element which provides direct and/or indirect evidence that a user and/or account has successfully authenticated in accordance with an authentication framework (e.g., against one or more of the authoritative DNS servers 204). As such, authentication tokens may have been generated in accordance with the second authentication framework upon successful authentication of one or more users and/or one or more accounts with the authoritative DNS server. For example, a user and/or account might present authentication tokens to an authentication server (e.g., integrated with one or more authoritative DNS servers 204) and, in response, a token might be generated (and provided to the user, an account, and/or the DNS Intermediary Ownership API, and/or stored in a database). In such an example, the token might serve to prove that the user and/or account has successfully authenticated, such that they need not re-provide their authentication credentials during access to resources (e.g., the one or more authoritative DNS servers 204) over time. As such, the process described with respect to step 303 might serve to confirm that a user and/or account has been authenticated in accordance with a particular authentication framework at some point prior to receipt of the DNS request in step 301.

In step 303, the computing device may determine whether the authentication credentials of the DNS request and/or of the DNS Intermediary Ownership API are associated with existing tokens. In other words, as already suggested above, step 302 and step 303 might serve to determine whether a user (e.g., a user associated with the authoritative DNS servers) has been authenticated at some point in time. If the authentication credentials are associated with existing tokens, the method 300 proceeds to step 304. Otherwise, the method 300 proceeds to step 306.

In step 304, based on determining that the authentication credentials are associated with existing tokens, the computing device may generate a modified DNS request with a secret key. In other words, based on determining that a user has already been authenticated with a particular framework, the computing device might trust that authentication and append, to a received DNS request, a secret key which validates the DNS request. As modified, the DNS request might thereby comprise the information originally provided by the user in addition to additional information appended by the computing device in response to determining that a user associated with the request has been authenticated. For example, the computing device may determine, based on the first authentication token, a secret key and generate a second modified DNS request comprising the second requested change to the second DNS CNAME record, the first authentication token, and the secret key.

In step 305, the computing device may transmit the modified DNS request generated in step 304. Such a transmission might be to one or more of the DNS servers 204, such as the one or more primary authoritative DNS name servers (write servers) 205a (in the case of a request to create, delete, and/or modify a DNS record) and/or the one or more secondary authoritative DNS name servers (read servers) 205b (in the case of a DNS request associated with a DNS query or the like). For example, the computing device may transmit the second modified DNS request to the DNS server.

In step 306, based on determining that the authentication credentials are not associated with existing tokens, the computing device may determine whether the authentication credentials are valid. This step may involve determining whether the authentication credentials are valid with respect to a different authentication framework as compared to the authentication framework involved with respect to step 302 and/or step 303. For example, the computing device may, based on determining that the first authentication credentials are not associated with the one or more existing authentication tokens, determine, by querying a second authentication database corresponding to a second authentication framework different from the first authentication framework, whether the first authentication credentials are valid. Such a process might not necessarily involve tokens: for example, the authentication credentials might comprise a username and password, and step 306 might comprise determining whether that username and password are valid. If the authentication credentials are valid, the method 300 proceeds to step 307. Otherwise, the method 300 proceeds to step 309.

Determining whether the authentication credentials are valid may be based on determining whether the authentication credentials are on a blocklist. One advantage of the process described herein is that DNS requests associated with malicious activity (e.g., DoS attacks) might be blocked well before they are received by the DNS servers 204. This can preserve the security of those servers and protect them from being overloaded. In turn, as part of the process described with respect to step 306, the authentication credentials might be compared to a blacklist associated with users that are associated with malicious activity. For example, the computing device may compare the first authentication credentials to a blocklist and, if the first authentication credentials are on that blocklist, the DNS request may be denied.

There may be as many as two different sets of authentication credentials involved in the present system. First, there may be authentication credentials specifically for the DNS servers 204 (which might be managed by the DNS Ownership Intermediary API server 202a). Second, there may be authentication credentials for users and/or applications (e.g., development platforms, intermediary applications) which allow users to interface with the DNS Ownership Intermediary API server 202a. In this circumstance, as part of the process depicted in FIG. 3, the DNS request received in step 301 may comprise authentication credentials from the second set of authentication credentials received above and/or a relevant key and/or token that evinces successful authentication of the second set of authentication credentials. Only after receiving that DNS request would subsequent authentication be performed using the first set of authentication credentials referenced above. This approach has numerous approaches: it ensures that the first set of authentication credentials are more secure, allows for more careful management of tokens associated with the first set of authentication credentials, and the like. For example, for the Infoblox platform, the present disclosure could keep track of token expiration and refresh the token only when absolutely necessary, minimizing the number of times that the Infoblox platform must handle computationally-expensive authentication and/or token generation.

In step 307, based on determining that the authentication credentials are valid, the computing device may generate a modified DNS request with shared credentials. In this manner, unlike step 304 (where the DNS request is modified with a secret key), the DNS request is modified such that it has appropriate authentication credentials to perform the DNS request. For example, the computing device may, based on a determination that the first authentication credentials are valid, generate a modified DNS request comprising the first requested change to the first DNS CNAME record and the shared authentication credentials of the first authentication framework.

The shared credentials might comprise any information that permits the DNS request to be implemented by the DNS servers 204. For example, the shared credentials might comprise a token that is authenticated by the DNS servers 204 as part of implementing the DNS request. In this manner, the computing device might vouch for the DNS request.

The difference between step 304 (which involves modifying the DNS request to add a secret key) and step 307 (which involves modifying the DNS request to add shared credentials) might be based on the nature of the credentials provided by the user as part of the DNS request received in step 301. In the case of step 304, where the authentication credentials are associated with existing tokens, the DNS request can be (with modification) essentially forwarded over to the DNS servers 204 because the DNS request might already contain the appropriate information to be authenticated by the DNS servers 204 themselves. In contrast, in the case of step 307, the DNS request might comprise authentication credentials that might be valid, albeit for an entirely different framework than that used by the DNS servers 204 (and thus might not be found valid by the DNS servers 204). This is, in part, the motivation for appending the shared credentials to the DNS request: the computing device determines that the authentication credentials are correct (albeit for the wrong framework) and corrects this deficiency by replacing those authentication credentials with shared authentication credentials. Moreover, this serves to not overwhelm the DNS servers 204: because this results in a greater number of users using the same shared authentication credentials with the DNS server 204, the authentication burden on the DNS servers 204 is somewhat lessened.

In step 308, the computing device may transmit the modified DNS request generated in step 307. This step may be similar to or the same as step 305, albeit with a different modified DNS request. Such a transmission might be to one or more of the DNS servers 204, such as the one or more primary authoritative DNS name servers (write servers) 205a (in the case of a request to create, delete, and/or modify a DNS record) and/or the one or more secondary authoritative DNS name servers (read servers) 205b (in the case of a DNS request associated with a DNS query or the like). For example, the computing device may transmit the modified DNS request to a DNS server.

After the process described in step 308, the computing device may receive a response to the modified DNS request and send a modified form of the response to a user device. Because the computing device might have replaced a user's original authentication credentials with shared authentication credentials, a response received by the DNS servers 204 (e.g., a response to a DNS query, a confirmation that a CNAME record was created) might include some indication of the shared credentials, rather than the user's credentials. To remedy this problem, the computing device might be configured to modify DNS responses. For example, the computing device may receive, from the DNS server, a response to the modified DNS request, modify the response to the modified DNS request by removing, from the response, one or more indications of the shared authentication credentials, and send the modified response to a user device. In this way, users might not inadvertently learn about the shared credentials (which might be kept private for security purposes).

In step 309, if the authentication credentials are not valid, the computing device may cause output of a denial notification. After all, in the circumstance represented by step 309, the authentication credentials are not valid under either authentication framework. For example, the computing device may, based on determining that the second authentication credentials are not associated with the one or more existing authentication tokens, and based on determining that the second authentication credentials are valid, cause output of a notification that the second DNS request is denied.

Discussion will now turn to another advantage of the DNS Ownership Intermediary API framework: the ability of the framework to dynamically route DNS requests to different DNS servers (e.g., one for write requests, one for read requests) in a manner that can lower the processing burden on those DNS servers while simultaneously protecting against DoS attacks.

Figure 4:
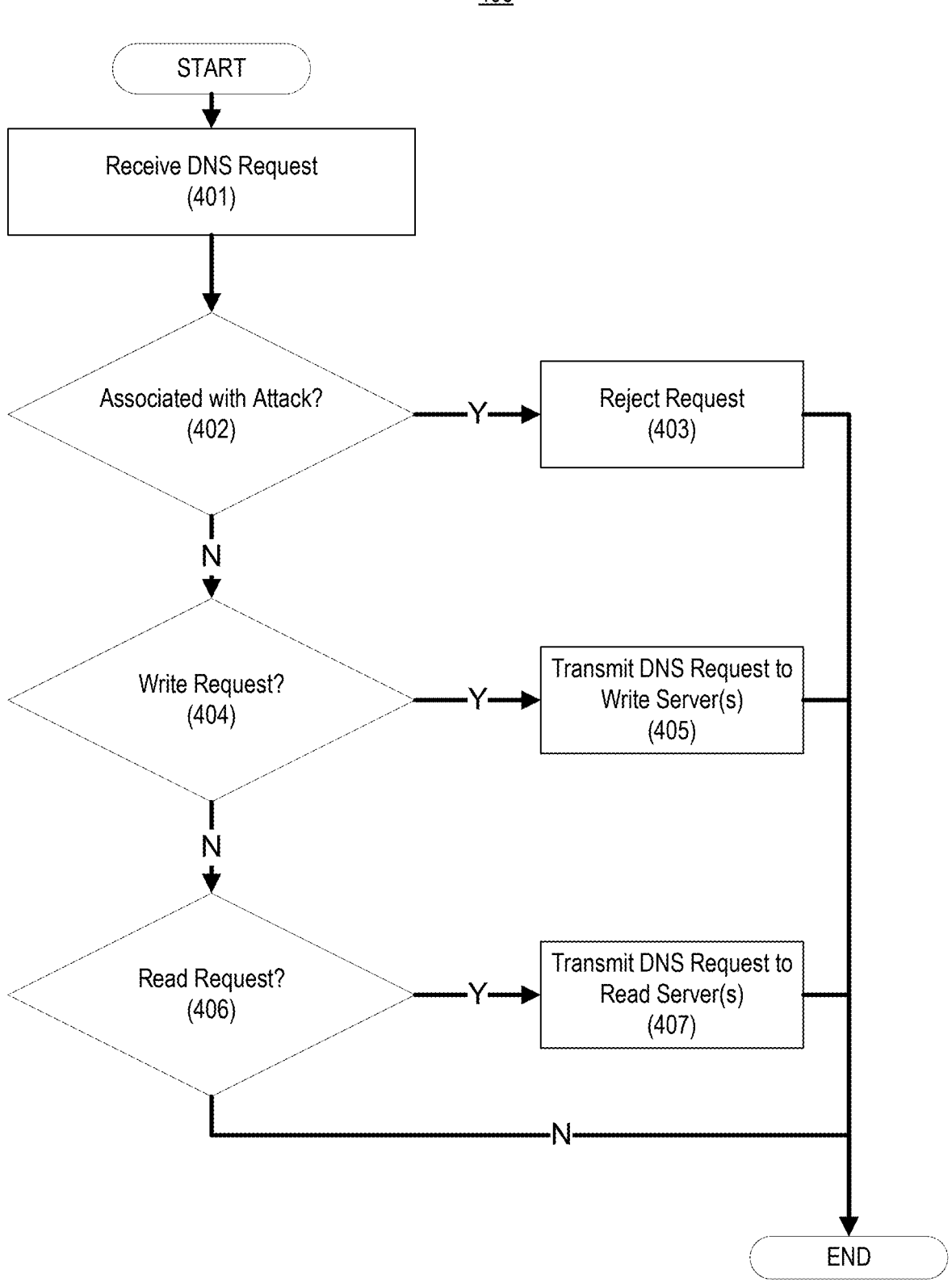
FIG. 4 depicts a flow chart comprising steps which may be performed to protect DNS servers from DoS attacks.

FIG. 4 depicts a flow chart depicting a method 400 comprising steps which may be performed by a computing device, such as the DNS Ownership Intermediary API server 202a of FIG. 2. A computing device may comprise one or more processors and memory storing instructions that, when executed by the one or more processors, cause performance of one or more of the steps of FIG. 4. One or more non-transitory computer-readable media may store instructions that, when executed by one or more processors of a computing device, cause the computing device to perform one or more of the steps of FIG. 4. Additionally and/or alternatively, one or more of the devices depicted in FIG. 2, such as the one or more servers 201 and/or the one or more user devices 203, may be configured to perform one or more of the steps of FIG. 4. Moreover, all or portions of the steps of FIG. 4 may be the same or similar as the elements and concepts depicted with respect to FIG. 2. For simplicity, the steps below will be described as being performed by a single computing device; however, this is merely for simplicity, and any of the below-referenced steps may be performed by a wide variety of computing devices, including multiple computing devices.

In step 401, the computing device may receive a DNS request. This step may be the same or similar to step 301 of FIG. 3. For example, a computing device may receive, via an Application Programming Interface (API), a first DNS request. The DNS request may comprise, for example, a request to create, modify, and/or delete a CNAME record.

In step 402, the computing device may determine whether the DNS request is associated with an attack. This step acts as a protection for the system overall, effectively preventing the routing of any request that might be associated with an attack regardless of whether the request is to query a DNS, modify a DNS record, or the like. An attack may be detected based on a DNS request originating from a user on a blocklist, based on a quantity of DNS requests being received within a period of time, or the like. If the DNS request is associated with an attack, the method 400 proceeds to step 403. Otherwise, the method 400 proceeds to step 404.

An attack may comprise any malicious activity associated with one or more DNS servers and/or DNS records, and is not necessarily limited to a DoS attack. An attack may comprise, for example, an attempt to inject malicious data into a DNS record, an attempt to burden a DNS by querying it a large quantity of times, or the like. An attack might be automatically detected by the computing device based on a number of queries to a DNS from one or more sources exceeding a predetermined quantity. For example, if the computing device determines that a single IP address is requesting thousands of DNS queries per second, the computing device might determine that such activity comprises an attack. As another example, if the computing device detects that particular authentication credentials are associated with an attempt to modify existing CNAME records to redirect traffic to untrusted IP addresses, then the computing device might determine that such activity is an attack.

In step 403, based on determining that the DNS request is associated with an attack, the computing device may reject the DNS request. Such a step may comprise causing display, on the one or more user devices 203, of a user interface element informing the user that a DNS request is denied. For example, the computing device may, based on determining that the second DNS request is associated with a user on a blocklist, cause display, on a user device, of a notification indicating that the second DNS request is denied. As another example, the computing device may, based on a quantity of DNS requests received during a predetermined time period satisfying a threshold, cause display, on a user device, of a notification indicating that the second DNS request is denied.

In step 404, if the DNS request is not associated with an attack, the computing device may determine whether the DNS request is a write request. As used herein, a write request might correspond to any activity associated with modification of DNS records, such as the creation of a new DNS record, a modification to an existing DNS record, the deletion of a DNS record, and the like. For example, the HTTPS commands for such write requests may include CREATE, UPDATE, DELETE, and GIVE-OWNERSHIP. The HTTP GET request(s) received may be treated as read requests of one or more DNS records and/or zones, and HTTP POST, PATCH, DELETE, and/or PUT requests may be considered write requests. Such HTTP methods may correspond to actions of CREATE, UPDATE, DELETE, and GIVE-OWNERSHIP on an individual DNS record or several DNS records. That said, CREATE/UPDATE/GIVE-OWNERSHIP might not be methods in HTTPS. The intermediary API may, in addition to HTTP method, also determine based on request HTTP path, HTTP body, HTTP headers, or other values specific to the request, whether the request is a read or write request. If the DNS request is a write request, the method 400 proceeds to step 405. Otherwise, the method 400 proceeds to step 406.

In step 405, if the DNS request is a write request, the computing device may transmit the DNS request to one or more write servers, such as the one or more primary authoritative DNS name servers (write servers) 205*a*. For example, the computing device may, based on determining that the first DNS request comprises a requested change to a first DNS record, route the first DNS request to the first DNS server. In turn, the first DNS server may receive the first DNS request, modify a DNS record based on the first DNS request, and transmit the modified DNS record to the second DNS server.

In step 406, if the DNS request is not a write request, the computing device may determine whether the DNS request is a read request (e.g., is a DNS query). As used herein, a read request may comprise any type of attempt to access content stored in a DNS record, such as a DNS query, a request to access a particular field of a DNS record, or the like. For example, the HTTPS commands for such read requests may include GET CNAME. If the DNS request is a read request, the method 400 proceeds to step 407. Otherwise, the method 400 ends.

In step 407, if the DNS request is a read request, the computing device may transmit the DNS request to one or more read servers, such as the one or more secondary authoritative DNS name servers (read servers) 205*b*. For example, the computing device may, based on determining that the second DNS request comprises a read request associated with the first DNS record, route the second DNS request to the second DNS server. In turn, the second DNS server may store the modified DNS record provided by the first DNS server, receive the second DNS request, and provide, in response to the second DNS request, the modified DNS record.

Step 404 and/or step 406 may be conditioned on successful validation of authentication credentials, such as is described with respect to FIG. 3. In other words, in addition to and/or as an alternative to step 402, the computing device may be configured to determine whether authentication credentials provided along with (e.g., as part of) the DNS request are valid. The DNS request may comprise authentication credentials. In turn, for example, the computing device may be configured to route the first DNS request to the write DNS server further based on validating the authentication credentials of the first DNS request.

As suggested by the steps depicted in FIG. 4, a write DNS server may be configured to periodically update read DNS servers, such that both servers might maintain copies of DNS records. For example, a first DNS server may maintain a first copy of DNS records, a second DNS server may maintain a second copy of the DNS records, and the first DNS server may be configured to transmit the modified DNS record to the second DNS server as part of an update to the second copy of the DNS records.

Discussion will now turn to another advantage of the DNS Ownership Intermediary API system described herein: the ability to detect and remediate errors in DNS requests that might inadvertently create new DNS subzones.

Figure 5:
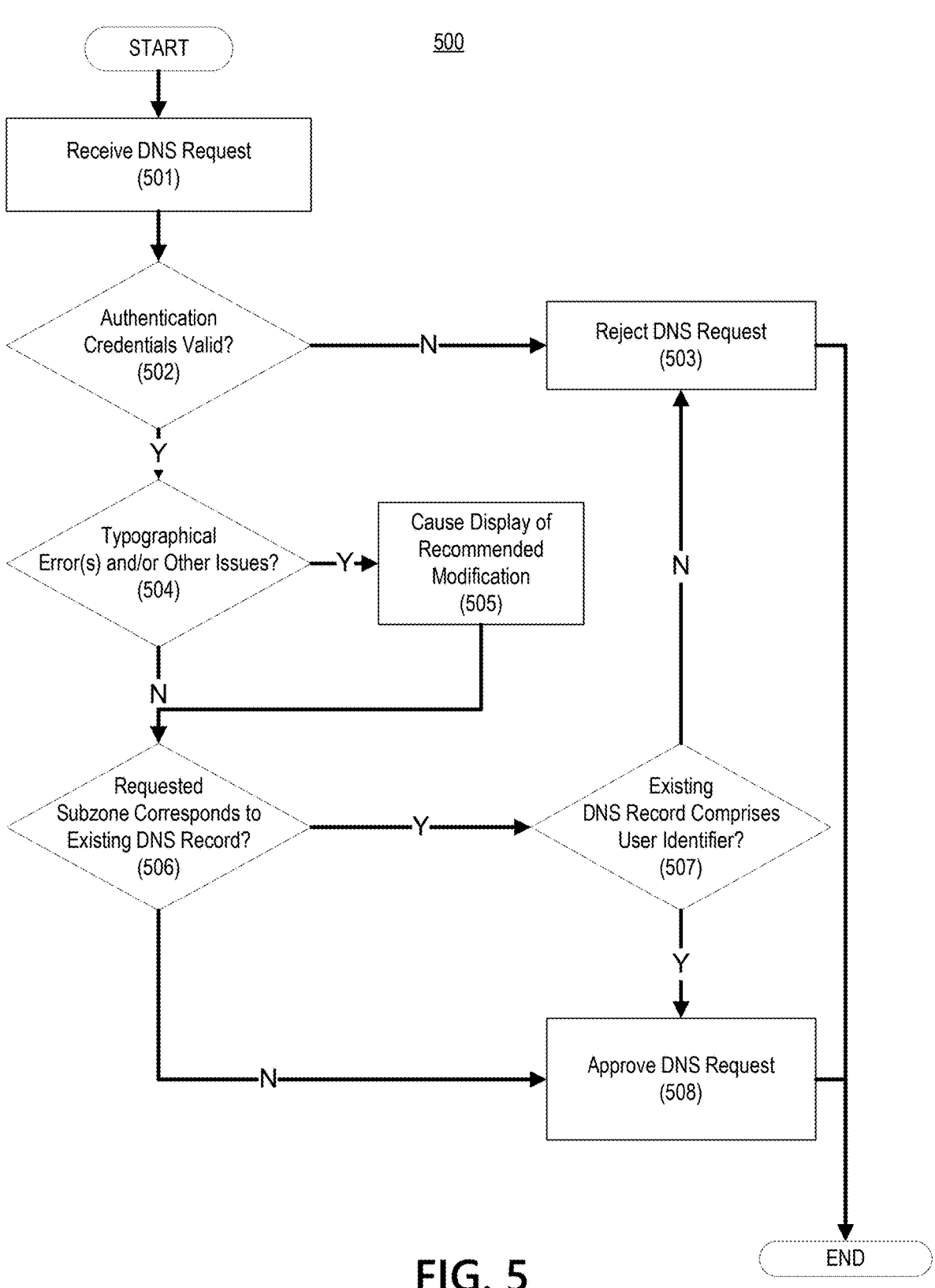
FIG. 5 depicts a flow chart comprising steps which may be performed to validate DNS requests to avoid typographical errors inadvertently creating DNS zones.

FIG. 5 depicts a flow chart depicting a method 500 comprising steps which may be performed by a computing device, such as the DNS Ownership Intermediary API server 202*a* of FIG. 2. A computing device may comprise one or more processors and memory storing instructions that, when executed by the one or more processors, cause performance of one or more of the steps of FIG. 5. One or more non-transitory computer-readable media may store instructions that, when executed by one or more processors of a computing device, cause the computing device to perform one or more of the steps of FIG. 5. Additionally and/or alternatively, one or more of the devices depicted in FIG. 2, such as the one or more servers 201 and/or the one or more user devices 203, may be configured to perform one or more of the steps of FIG. 5. Moreover, all or portions of the steps of FIG. 5 may be the same or similar as the elements and concepts depicted with respect to FIG. 2. For simplicity, the steps below will be described as being performed by a single computing device; however, this is merely for simplicity, and any of the below-referenced steps may be performed by a wide variety of computing devices, including multiple computing devices.

In step 501, the computing device may receive a DNS request. This step may be the same or similar as step 301 of FIG. 3. For example, the computing device may receive, via an Application Programming Interface (API), a first request to create a DNS Canonical Name (CNAME) record. As was the case with respect to step 301 of FIG. 3, that DNS request might comprise authentication credentials. For example, the first request may comprise first authentication credentials corresponding to a first user. The DNS request might also comprise information such as a first user identifier and/or an identification of a requested DNS subzone.

In step 502, the computing device may determine whether authentication credentials of the DNS request are valid. This process may be the same or similar as step 302, step 303, and/or step 306 of FIG. 3: for instance, the computing device might query a server to determine whether the authentication credentials are valid by determining whether the authentication credentials correspond to an existing token and/or whether the authentication credentials are stored in a database. If the credentials are valid, the method 500 proceeds to step 503. Otherwise, the method proceeds to step 504.

In step 503, based on determining that the authentication credentials are not valid, the computing device may reject the DNS request. After all, if the authentication credentials are not valid, the computing device should likely prevent the DNS request from being implemented by the DNS servers 204. This process might comprise causing the one or more user devices 203 to display, in a user interface, some form of a rejection notification. For example, the computing device may, based on determining that the requested DNS record's subzone corresponds to an existing DNS subzone, based on validating the third authentication credentials, and based on determining that the third user identifier is not indicated in any DNS records associated with the existing DNS subzone, cause display, in the user interface, of an indication that the third request to create the DNS CNAME record is denied.

In step 504, based on determining that the authentication credentials are valid, the computing device may determine whether there are any typographical errors in the DNS request and/or other issues in the DNS request. This step may include using natural language processing algorithms to identify errors in text provided via the DNS request. For example, the computing device may, based on determining that the requested DNS record's subzone does not correspond to any existing DNS subzones, identify a typographical error in the second identification by processing, using a natural language processing algorithm, the second identification. As another example, additional (e.g., custom) validations may be performed to check for various issues, such as requests for particular types of DNS records. For instance, a custom validation may check whether a DNS request is of a type CNAME in the s3.amazonaws.com domain (and/or other cloud domains) due to vulnerabilities associated with such records. If there are typographical errors in the DNS request, the method 500 proceeds to step 507. Otherwise, the method 500 proceeds to step 508.

One advantage of step 504 is that it may protect against certain DNS-related vulnerabilities, particularly those relevant to cloud DNS usage. It may be unfortunately common for certain CNAME and/or NS records to be left existing and pointing to resources outside of an enterprise, even in circumstances where the application reliant on those CNAME and/or NS records might have long since been decommissioned. Indeed, it is not uncommon for such attacks to be made on cloud services provided on the Amazon Web Services and/or Microsoft cloud platforms. While those services might provide after-the-fact protection against such issues, aspects described herein can proactively protect against such results. For example, the computing device may be configured to prevent the creation of DNS subzones and/or certain types of CNAME and/or NS records. In particular, step 506 may comprise preventing the creation of CNAME and NS targets within certain domains (e.g., domains known to be malicious, risky, or the like) and/or A/AAAA records with targets within certain IP address ranges (e.g., those known to be risky). Moreover, because (as described elsewhere in the present disclosure) records may be associated with specific users, dangling, abusive, and/or otherwise risky records might be traced back to an origin (such that, for example, compromised user accounts might be located as applicable).

Ownership of DNS records may be transferred, by the API, between various users. This is a function generally not performable by conventional DNS. For example, a first user might transfer ownership of a DNS record to a second user. As another example, a first user might request ownership of a DNS record from a second user. In either circumstance, if both parties provide approval and/or if both parties are successfully validated, then the DNS record might be so transferred by, for example, modifying the comment field of the DNS record and/or otherwise modifying an ownership indication associated with the DNS record. For instance, an owner of a DNS record might be able to accept a request to transfer a DNS record (and thereby cause the DNS record to be modified to indicate new ownership), reject the request (e.g., by sending a notification to the party requesting the transfer), or perform other options (e.g., requesting more information from the requestor, add the requestor to the DNS record but preserve their own ownership of the DNS record, or the like). In some circumstances, DNS records might be proactively transferred. For example, owner approval to transfer a DNS record might not be required where, for instance, the record does not have an owner, where the record has not been used for a predetermined period of time, where the DNS record is considered unimportant (e.g., the DNS record is an internal, testing-only record), or the like.

The determination of whether there is a typographical error may be based on comparing all or portions of the identification of the requested subzone indicated in the DNS request with one or more existing DNS subzones. The computing device may store a listing of existing DNS subzones and compare this listing to the identification of the requested subzone indicated in the DNS request to determine whether, for example, a user has transposed alphanumeric characters, misspelled a word, or the like. In this manner, the computing device might be configured to identify circumstances where a user intended to identify an existing DNS subzone, but might have inadvertently included a typographical error which, under ordinary circumstances, would have caused an entirely new DNS subzone to be created.

As indicated above, determination of whether there is a typographical error may be based on use of a natural language processing algorithm. A variety of algorithms might be used. For example, for organizations principally conducting business in English, a natural language processing algorithm using English language dictionary data might be used to identify typographical errors. As another example, an algorithm configured to detect foreign language characters (e.g., Chinese characters) might be used to determine whether content intended to be in the English language inadvertently includes Chinese characters.

In step 505, based on detecting a typographical error, the computing device may cause display of a recommended modification. Causing display of the recommended modification may comprise causing the one or more user devices 203 to display, in a user interface, a user interface element associated with the typographical error determined in step 506. The recommended modification might comprise some indication that the user should correct the typographical indication detected in step 506. For example, the computing device may cause, based on the typographical error, display, in a user interface, of a recommended modification to the second request. That said, the computing device might permit the user to ignore the recommendation and create a new DNS subzone. After all, in some circumstances, the user might have actually intended to create a new DNS subzone including the typographical error. As such, the user interface displayed by the one or more user devices 203 may permit the user to implement the modification and/or reject the recommendation and proceed with the DNS request.

The recommended modification may comprise a recommendation to modify one or more characters of the identification of a requested DNS subzone. Assume, for example, that a user inadvertently requested a new DNS subzone "finance" when the user in fact intended to modify a record associated with an existing "finance" DNS subzone. In such a circumstance, the recommended modification might comprise a prompt for the user to delete the additional "n" character.

In some cases, the computing device may prevent a DNS record with a typographical error. This may be implemented in a variety of ways. For example, in the event that a typographical error is detected in step 504 and a recommended modification is displayed in step 505, then the computing device might not proceed (e.g., and might prevent further steps of FIG. 5 and/or proceed to step 503) until the recommended modification is made. In other circumstances, the computing device might allow the user to proceed without fixing the typographical error, but might generate an alert based on the detection of such an error.

In step 506, and after the determination of whether a typographical error exists or not, the computing device may determine whether a requested DNS record creation request corresponds to an existing DNS zone by comparing the subzone of the requested record with a list stored by the intermediary API, and/or by querying the authoritative DNS server to see if the zone exists. In this manner, the computing device might determine whether the DNS requests is likely to, if implemented by the DNS servers 204, create a new DNS zone. If the requested subzone corresponds to an existing DNS record (such that, for example, a new DNS subzone would not be created), the method 500 proceeds to step 507. Otherwise, if the requested subzone does not correspond to an existing DNS record (such that, for instance, a new DNS subzone would be created), the method 500 proceeds to step 508.

As part of determining whether a requested DNS subzone request corresponds to an existing subzone, the computing device may validate a format of the identification of the requested DNS record's subzone. This may comprise querying an authoritative DNS server. One computationally straightforward way to detect whether a DNS request is likely to create a new subzone is to check whether a format of a DNS subzone indicated by the DNS request is similar to a format of existing subzones. For example, if all existing DNS subzones are alphanumeric, then a DNS request indicating a DNS subzone with asterisks is likely to not correspond to existing DNS subzones. Such a format might be determined based on processing DNS subzones to identify a common DNS subzone format (e.g., a common character length, common typographic format). Additionally and/or alternatively, such a format might be set by an administrator.

In step 507, based on determining that the requested record does correspond to an existing DNS zone, the computing device may determine whether an existing DNS record associated with the DNS request comprises a user identifier indicated by the DNS request. This step provides an additional form of authentication: it confirms not merely that a user has valid authentication credentials (as is the case with respect to step 502), but also that a user is entitled to modify the particular DNS record that they are requesting to modify. Such a check might be performed by processing a comment field of the DNS record to see if a user identifier indicated by the DNS request received in step 501 is present in the comment field. An example of such an indication is provided with respect to FIG. 6. If the DNS record comprises the user identifier, the method 500 proceeds to step 508. Otherwise, the method 500 returns to step 503, where the DNS request is rejected.

While many of the examples provided herein describe the idea that a single user might be indicated as an owner of a particular DNS record, a plurality of different users might be associated with a DNS record. For example, the comment field of a DNS record may comprise a listing of users that are owners of the particular DNS record. This approach might be useful where, for example, two or more users (e.g., two developers working on the same project) might need equal ability to edit/delete the DNS record, In step 508, the computing device may approve the DNS request. After all, such a DNS request has valid authentication credentials, seemingly properly requests the creation of a new DNS record, and does not contain typographical errors. For example, based on determining that the requested DNS record's zone corresponds to an existing DNS subzone, based on validating the first authentication credentials, and based on determining that an existing DNS CNAME record corresponding to the existing DNS subzone comprises the first user identifier, the computing device may transmit the first request to a DNS server. This step may be the same or similar as step 305 and/or step 308 of FIG. 3.

As part of approving the DNS request, the computing device may modify the DNS request. This modification may be additional to any modification to the DNS request as described with respect to step 305 and/or step 308 of FIG. 3. For example, the first request may comprise a timeToLive value (e.g., an indication of how long a DNS server should cache a particular record and/or particular query), and the computing device may, as part of transmitting the first request, modify the timeToLive value based on the requested DNS record's subzone. As another example, the computing device may add, to a comment field of the first request, an indication of the first user identifier. This might be in service of indicating that the user is entitled to modify the record in the future, as discussed with respect to step 507. As another example, the computing device may add, to a comment field of the first request, a timestamp corresponding to a time when the computing device received the first request. This timestamp might be used by the computing device to track edits to DNS records.

In addition to the typographical error detection described in FIG. 5, a variety of different validations may be performed to similarly protect from attacks on DNS servers and/or DNS records. These validations might be performed in addition to and/or in replacement of the typographical error detection described above.

For example, the computing device may be configured to prevent hostile subdomain takeovers by preventing users from creating DNS records (e.g., CNAME records) directly aliasing cloud native A names. In this manner, users may be prevented from creating DNS records that correspond to A records that may disappear (and therefore might be replaced with malicious A records). This may, in practice, require that users use cloud-native DNS extensions such as the AWS Route53 ALIAS records as made available by Amazon Web Services Inc. of Seattle, Washington. In such a circumstance, if a user attempts to create and/or modify a DNS record directly aliasing a cloud native A name, steps such as step 507 may be performed (e.g., such that a proposed modification is displayed, such as a recommendation to use an ALIAS record instead).

As another example, the computing device may be configured to impose various requirements on CNAME records, such as requiring that CNAME records resolve to specific IP addresses and/or requiring that CNAME records resolve to IP addresses within a specific Classless Inter-Domain Routing (CIDR) ranges. Such CIDR ranges could be determined by an IP address management system and/or valid ranges may be limited by DNS zone and/or to certain Fully Qualified Domain Name (FQDN) formats. One reason such steps might be performed is to ensure that DNS records resolve to trusted resources: for example, company-internal DNS records might be limited to company-internal resources. In the case that a user tries to create and/or modify a DNS record in violation of such policies, steps such as step 507 may be performed (e.g., such that a proposed modification is displayed, such as a recommendation to use a different target (canonical name) for a certain CNAME record if the target of the request resolves by a DNS query to an IP or several IPs in a forbidden CIDR range or forbidden IP address list).

In a similar vein, the computing device may be configured to impose various requirements on NS and/or A and/or AAAA. For instance, such NS and/or A and/or AAAA records might be limited to specific IP addresses, to resolve to IP addresses within specific CIDR ranges, or the like. Recognizing that NS and/or A and/or AAAA records can create round-robin DNS problems, the computing device may additionally and/or alternatively require and/or prohibit NS and/or A and/or AAAA records from having multiple answers. In the case that a user tries to create and/or modify a DNS record in violation of such policies, steps such as step 507 may be performed (e.g., such that a proposed modification is displayed, such as a recommendation to use a different IP address for a certain AAAA record).

Moreover, the computing device may be configured to trust only certain nameservers. For example, the computing device may require authoritative nameservers for NS records and/or may require that nameservers follow a specific format and/or be in specific domains. In the case that a user tries to create and/or modify a DNS record in violation of such policies, steps such as step 507 may be performed (e.g., such that a proposed modification is displayed, such as a recommendation to use a different nameserver).

The computing device may additionally and/or alternatively impose additional limitations on the creation and/or modification of DNS records based on user permissions. For example, the computing device may impose limits on the configurability of which records and record types (if any) can have their ownership changed based on a current user's permissions, the configurability of which records and record types (if any) can have their ownership taken without a particular user's permissions, the configurability of which records and record types (if any) can be deleted, and/or the configurability of which records and record types (if any) can be updated. A variety of user- and group-specific limitations on DNS records may be accordingly implemented for security purposes. In the case that a user tries to create and/or modify a DNS record in violation of such policies, steps such as step 507 may be performed (e.g., such that a proposed modification is displayed, such as a recommendation to acquire permission from a specific user before modifying a particular DNS record). The user(s) associated with a particular DNS record may be indicated by metadata associated with that record. For example, the computing device may maintain, for each DNS record, an indication of user(s) and/or group(s) permitted to modify and/or delete that record, when the DNS record was created, and the like. In turn, such metadata might be useful to identify stale DNS records. Ownership of DNS records might be validated against a third-party system. For instance, by tracking whether DNS records are associated with active user accounts of an organization, the computing device may ensure that employee departures from an organization do not undesirably leave "orphaned" DNS records.

The computing device may additionally and/or alternatively impose additional limitations on the creation and/or modification of DNS records to standardize and/or otherwise make DNS records appropriate for particular uses. For example, the computing device may be configured to prevent the creation and/or modification of DNS records to add curse words and/or sensitive content into DNS records. As another example, the computing device may be configured to prevent the creation and/or modification of DNS records in a manner that is inconsistent with the formatting of other DNS records.

The computing device may additionally and/or alternatively perform different validations based on the type of activity (DNS record creation, DNS record modification, DNS record deletion) initiated by a user. For example, more onerous validations might be performed during DNS record creation as compared to DNS record modification.

FIG. 6 depicts an example of DNS records, such as those which might be queried and/or modified as described above with respect to FIG. 3, FIG. 4, and FIG. 5. For simplicity, FIG. 6 displays only A records and CNAME records. A first DNS record 601 is an A record resolving companyname.com to 192.168.1.1. A second DNS record 602 is an A record resolving inernal.companyname.net to 192.168.1.2. A third DNS record 603 is a CNAME record resolving www.companyname.net to www.companyname.com. A fourth DNS record 604 is a CNAME record resolving internal.companyname.net to internal.companyname.com. A fifth DNS record 605 is a NS record indicating that nameserver.companyname.com is the nameserver for companyname.net. The third DNS record 603 and the fourth DNS record 604 also comprise comment fields that indicate information about the user associated with the record and a timestamp corresponding to the record. For example, the second DNS record 602 has a comment field indicating both a user associated with the record ("User01") and a timestamp corresponding to the record ("2004-09-17T00:00:00.00"). As another example, the third DNS record 603 has a comment field indicating both a user associated with the record ("User01") and a timestamp corresponding to the record ("2004-09-17T00:00:00.04"). As another example, the fourth DNS record 604 has a comment field indicating both a user associated with the record ("User02") and a timestamp corresponding to the record ("2004-09-17T00:00:01.25"). As another example, the fifth DNS record 605 has a comment field indicating both a user associated with the record ("User01") and a timestamp corresponding to the record ("2004-09-17T00:00:02.41").

Figure 7:
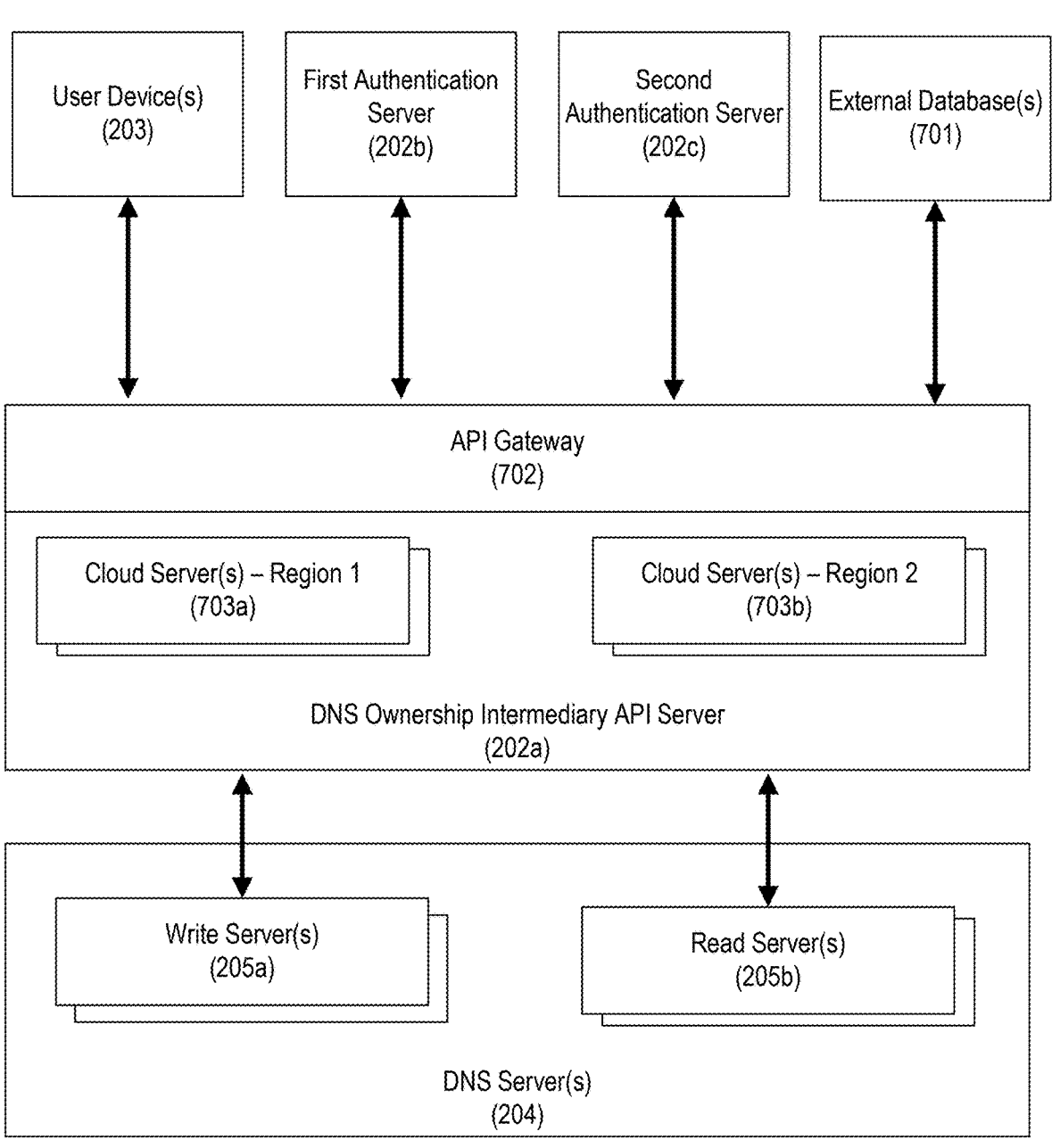
FIG. 7 depicts one example of an implementation of the DNS Ownership Intermediary API server.

FIG. 7 depicts one example of an implementation of the DNS Ownership Intermediary API server 202a. While FIG. 7 is in many ways similar to FIG. 2, it shows additional elements: namely, one or more external databases 701, an API gateway 702 as part of the DNS Ownership Intermediary API server 202a, first region cloud servers 703a as part of the DNS Ownership Intermediary API server 202a, and second region cloud servers 703b as part of the DNS Ownership Intermediary API server 202a.

The one or more external databases 701 may be used to store information associated with the operations of the DNS Ownership Intermediary API server 202a. For example, the one or more external databases 701 may be used to store an audit log associated with activity of the DNS Ownership Intermediary API server 202a. In this manner, DNS requests (particularly modifications to DNS records) might be logged and available for inspection by an administrator.

The API gateway 702 of the DNS Ownership Intermediary API server 202a may be used as an interface via which the DNS Ownership Intermediary API server 202a might communicate with the one or more user devices 203, the first authentication server 202b, the second authentication server 202c, and/or the one or more external databases 701. Such an API gateway might be available such that, for example, applications executing on the one or more user devices 203 can make structured calls to the DNS Ownership Intermediary API server 202a and, in return, such calls can be implemented by the DNS Ownership Intermediary API server 202a.

The first region cloud servers 703a as part of the DNS Ownership Intermediary API server 202a and the second region cloud servers 703b as part of the DNS Ownership Intermediary API server 202a represent that the DNS Ownership Intermediary API server 202a need not necessarily be located on a single server or computing device, but might instead be distributed across various computing device as, for example, part of a serverless application, as part of a cloud application, or the like. This approach might be particularly valuable in circumstances where the DNS Ownership Intermediary API server 202a handles large quantities of DNS requests, such as where the DNS Ownership Intermediary API server 202a is configured to route DNS queries from the user devices 203 to the secondary authoritative DNS name servers (read servers) 205b.

Figure 8:
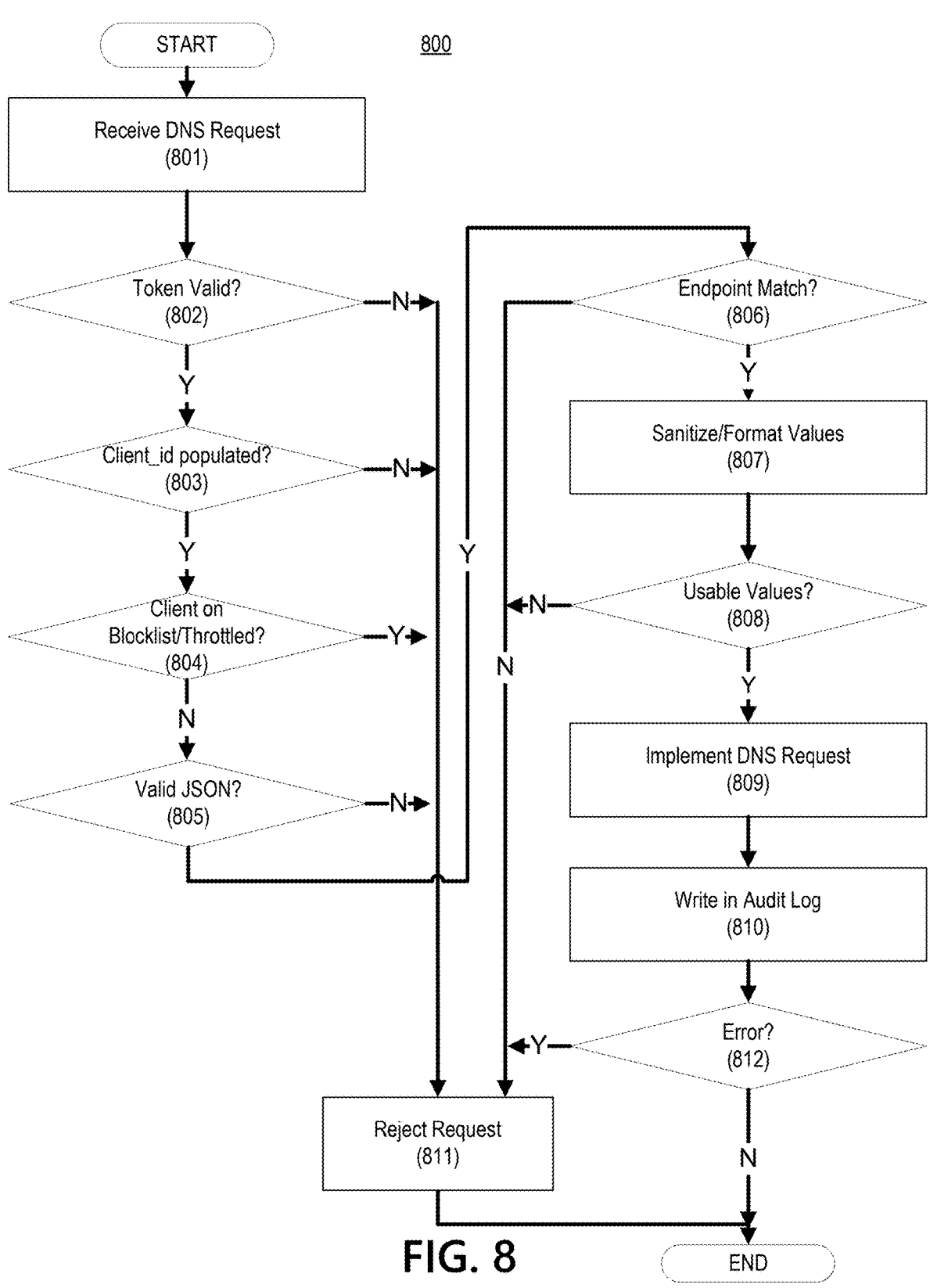
FIG. 8 depicts an example of steps which might be taken by the system depicted in FIG. 7.

FIG. 8 depicts an example of a method 800 which might be implemented by the system described with respect to FIG. 7. A computing device may comprise one or more processors and memory storing instructions that, when executed by the one or more processors, cause performance of one or more of the steps of FIG. 8. One or more non-transitory computer-readable media may store instructions that, when executed by one or more processors of a computing device, cause the computing device to perform one or more of the steps of FIG. 8. Additionally and/or alternatively, one or more of the devices depicted in FIG. 2 and/or FIG. 7, such as the one or more servers 201 and/or the one or more user devices 203, may be configured to perform one or more of the steps of FIG. 8. Moreover, all or portions of the steps of FIG. 8 may be the same or similar as the elements and concepts depicted with respect to FIG. 2 and/or FIG. 7. For simplicity, the steps below will be described as being performed by a single computing device; however, this is merely for simplicity, and any of the below-referenced steps may be performed by a wide variety of computing devices, including multiple computing devices In step 801, the computing device may receive a DNS request. This step may be the same or similar as step 301 of FIG. 3. For example, the DNS request may be received via the API gateway 702 of the DNS Ownership Intermediary API server 202a.

In step 802, the computing device may determine whether a token in the DNS request is valid. In this manner, the computing device may determine whether a Point of Presence (POP) and/or authentication token received via the API gateway 702 of the DNS Ownership Intermediary API server 202a is valid. This step may be the same or similar as step 302 and step 303 of FIG. 3. If the token is valid, the method 800 proceeds to step 803. Otherwise, the DNS request is rejected in step 810.

In step 803, the computing device may determine whether a client_id field or a similar field is populated. This step may be performed to verify that the DNS request is associated with a trusted user, application, or the like. In turn, the DNS request might be proper if it comprises a client_id, user_id, and/or app_id that is trusted, but might be rejected if it is not. If the client_id field (or a similar field) is populated, the method 800 proceeds to step 804. Otherwise, the DNS request is rejected in step 810.

In step 804, the computing device may determine whether the client is on a blocklist and/or throttled. This inquiry might be the same or similar as discussed with respect to step 402 and 403 of FIG. 4. If the client is on a blocklist and/or throttled, the DNS request is rejected in step 810. Otherwise, the method 800 proceeds to step 805.

In step 805, the computing device may determine whether the DNS request comprises valid JSON. For example, the computing device may parse the DNS request body to confirm that the body comprises a valid JSON object. If the DNS request comprises valid JSON, the method 800 proceeds to step 806. Otherwise, the DNS request is rejected in step 810.

In step 806, the computing device may determine whether an endpoint match exists. In this manner, the computing device might determine whether, based on the request (e.g., write request, read request) a valid endpoint (e.g., to a write server, read server) can be matched. If an endpoint match exists, the method 800 proceeds to step 807. Otherwise (e.g., if there is an invalid endpoint), the DNS request is rejected in step 810.

Following step 806, the computing device may begin to take steps to implement the DNS request, to the extent possible. In step 807, the computing device may sanitize and/or format the values of the DNS request. This process may include ensuring that each datatype matches the schema, removing unnecessary whitespace, or the like. Then, in step 808, the computing device may evaluate whether the sanitized and/or formatted values of the DNS request are usable. For instance, the computing device may compare the sanitized and/or formatted values of the DNS request to a standard, test the values using an algorithm, or perform similar steps to evaluable the appropriateness of the values. If the sanitized and/or formatted values of the DNS request are usable, the method 800 proceeds to step 809. Otherwise, the request is rejected in step 811.

In step 809, the computing device may implement the DNS request. This may include taking specific steps based on whether the DNS request is a write request or read request. For example, different request flows may be followed based on whether the DNS request corresponds to a CREATE command, a READ command, an UPDATE command, a DELETE command, a GET-BY-OWNER command, or a GIVE-OWNERSHIP command. Upon successful completion of step 809, a response (e.g., an HTTP response) may be received and provided back to a user.

In step 810, the computing device may write information associated with the DNS request in an audit log. The audit log may be stored by the one or more external databases 701 described with respect to FIG. 7. As described with respect to that figure, such an audit log may permit the system to track and audit changes to DNS records.

In step 812, the computing device may determine whether an error has occurred. An error may comprise, for example, a cache error created during a read of data, during authentication of tokens provided by the DNS request, and/or the caching of values. If an error has occurred, the DNS request is rejected in step 811. Otherwise, the method 800 ends successfully.

Step 811, which occurs whenever the DNS request is rejected, may be the same or similar as step 309 of FIG. 3. This process may include outputting one of a variety of HTTP codes, such as HTTP 401, HTTP 429, HTTP 400, HTTP 403, HTTP 500, or the like. Additionally and/or alternatively, this process may comprise transmitting an alert to an administrator.

Discussion will now turn to various examples of how the process described above might be implemented in view of different types of CNAME requests. These are simplified examples which illustrate a process flow which might be performed by the DNS Ownership Intermediary API server 202a as part of and/or in addition to the steps described in FIG. 3, FIG. 4, FIG. 5, and FIG. 8. Examples will be provided for read requests, updates, create requests, delete requests, give-ownership requests, and get-by-ownership requests.

When the computing device receives a DNS request to read one or more DNS records, it may first parse the request to validate the CNAME. If the CNAME is invalid, the computing device may return an HTTP 400 error. That said, if the CNAME is valid, it may create a read request and send it to the DNS servers 204. If that request is unsuccessful, the computing device may return an HTTP 500 error. Otherwise, if the request is successful, the computing device may determine if it includes an appropriate record. If not, the computing device may return an HTTP 404 error, as the CNAME does not exist. If so, the computing device might parse the response. For example, various fields of the response might be renamed to match user expectations, an ownerID field might be populated based on a comment field, and the like. The response might then be provided back to the requestor (e.g., the one or more user devices 203).

When the computing device receives a DNS request to update one or more DNS records, it may first parse the request. Such parsing might include validating the CNAME field, validating a host field (if not null), confirming the timeToLive value (e.g., confirming that it, if not null, is greater than a minimum value and a maximum value established by a zone), validating other fields, and confirming that all request fields are not null. The computing device may then perform the read request flow described above to access the CNAME information and confirm that the ownerID indicated by the DNS record is the same as that provided by the update request. Then, the computing device may build a request to one or more DNS servers (e.g., to the DNS Ownership Intermediary API Server 202a and/or the DNS servers 204) to update the corresponding DNS record. This may include putting "_ref" in the request body, modifying host values, modifying timeToLive values, modifying asvName values, updating timestamps in the comments field, and the like. This built request may be sent to the DNS servers 204. If successful, the response may be provided to the requestor. Otherwise, an error (e.g., HTTP 500) may be output by the computing device.

When the computing device receives a DNS request to create a DNS record, it may first parse the request in the same or a similar manner as described above with respect to the update request. The computing device may then build the request by, for example, setting "canonical=host" in the request body, setting "ttl=timeToLive" in the request body, building a comment field that indicates both the user and a timestamp, configuring the "set name" field to "CNAME," and setting a view (e.g., a default view). This built request may be sent to the DNS servers 204. If successful, the response may be provided to the requestor. Otherwise, an error (e.g., HTTP 500) may be output by the computing device.

When the computing device receives a DNS request to delete one or more DNS records, it may first validate the CNAME field of the request and perform the above-described read request flow to identify the corresponding CNAME record. If either of these processes fail, the computing device may output an error (e.g., HTTP 400 and/or HTTP 404). The computing device may then validate that the user is entitled to delete the DNS record by confining that the comment field of the DNS record indicates the same user as indicated by the DNS request. Once those steps are successful, the computing device may send the delete request to the DNS servers 204. If successful, the response may be provided to the requestor. Otherwise, an error (e.g., HTTP 500) may be output by the computing device.

When the computing device receives a DNS request to give ownership of a DNS record, it may first validate the CNAME field of the request and validate that a new owner ID is valid. If either of these processes fail, the computing device may output an error (e.g., HTTP 400 and/or HTTP 404). The computing device may then perform the above-described read request flow to identify the corresponding CNAME record. If the owner ID indicated by the given ownership request is the same as that indicated by the comment field of the CNAME record, the owner ID indicated by that comment field may be replaced by the validated new owner ID. If successful, the response may be provided to the requestor. Otherwise, an error (e.g., HTTP 500) may be output by the computing device.

When the computing device receives a DNS request to get DNS records by the owner, the computing device may first validate the owner ID to ensure it is alphanumeric. If not, the computing device may return an HTTP 400 error. Otherwise, the computing device may perform a regex read to find DNS records where the comment field indicates the owner ID. If any records result from such a query, those records may be provided to the requestor. Otherwise, the computing device might output an HTTP 500 error.

FIG. 9 is an example of a schema which might be used as part of communications involving the DNS Ownership Intermediary API server 202a, such as might be used when transmitting requests via the API gateway 702. Particularly, FIG. 9 shows a schema for POST requests, showing various items (e.g., tokens, CNAME, host, timeToLive) that might be provided as part of such a request.

Many of the examples provided herein relate to CNAME DNS records, but the disclosure herein is not limited to CNAME records. As described throughout the disclosure above, the process described herein may be equally applicable to a wide variety of DNS records, such as ALIAS records, A records, AAAA records, and the like.

Figure 10:
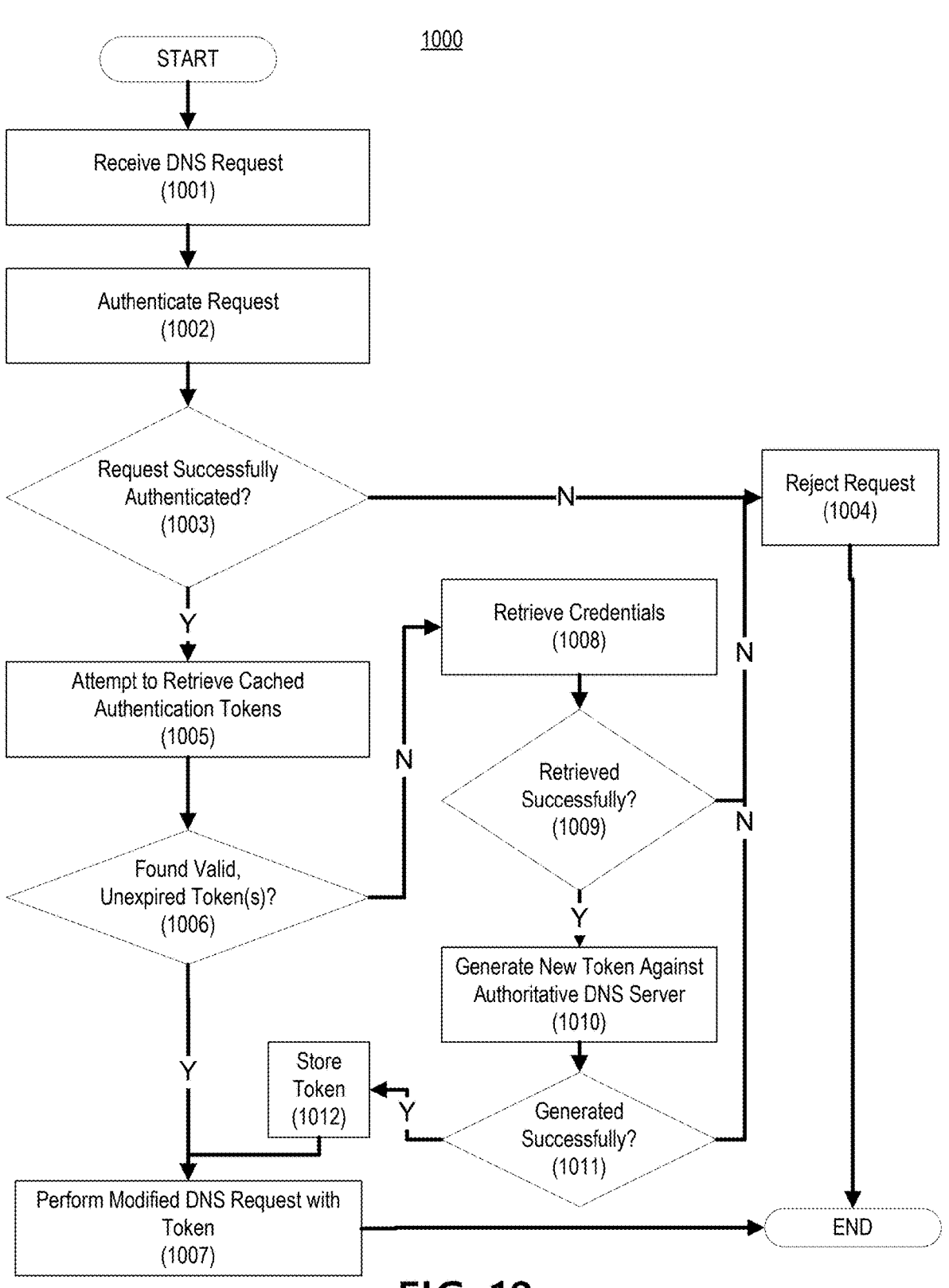
FIG. 10 depicts a flow chart comprising steps which may be performed to manage authentication for a DNS using shared authentication credentials of a first authentication framework.

FIG. 10 depicts a flow chart depicting a method 1000 comprising steps which may be performed by a computing device, such as the DNS Ownership Intermediary API server 202a of FIG. 2. A computing device may comprise one or more processors and memory storing instructions that, when executed by the one or more processors, cause performance of one or more of the steps of FIG. 10. One or more non-transitory computer-readable media may store instructions that, when executed by one or more processors of a computing device, cause the computing device to perform one or more of the steps of FIG. 10. Additionally and/or alternatively, one or more of the devices depicted in FIG. 2, such as the one or more servers 201 and/or the one or more user devices 203, may be configured to perform one or more of the steps of FIG. 10. Moreover, all or portions of the steps of FIG. 10 may be the same or similar as the elements and concepts depicted with respect to FIG. 2. For simplicity, the steps below will be described as being performed by a single computing device; however, this is merely for simplicity, and any of the below-referenced steps may be performed by a wide variety of computing devices, including multiple computing devices.

In step 1001, the computing device may receive a DNS request. This may be the same or similar as step 301 of FIG. 3.

In step 1002, the computing device may authenticate the request. This may be the same or similar as step 302 and/or 303 of FIG. 3. This step may comprise performing a TLS handshake on the DNs request, querying an authentication server and/or an authentication database using the authentication credentials of a user, performing an OAUTH Proof of Possession token validation on the DNS request, and/or performing a public key validation against the user based on a user ID and a provided user token.

In step 1003, the computing device may determine whether the request was successfully authenticated. This may comprise determining whether the request was successfully authenticated and contains a valid user identifier or client identifier. This may be the same or similar as step 302 and/or 303 of FIG. 3. If so, the method 1000 proceeds to step 1005. Otherwise, the method 1000 proceeds to step 1004, where the DNS request is rejected.

In step 1005, the computing device may attempt to retrieve cached authentication tokens. This step may comprise attempting to retrieve cached authentication tokens for an authoritative DNS. This step may be the same or similar as step 303 of FIG. 3.

In step 1006, the computing device may determine whether valid, unexpired token(s) were found. This may be the same or similar as step 303 of FIG. 3. If so, the method 1000 proceeds to step 1007. Otherwise, the method 1000 proceeds to step 1008.

In step 1007, the computing device may perform a modified form of the DNS request with the token. This may be the same or similar as step 304, step 305, step 307, and/or step 308 of FIG. 3.

In step 1008, if valid and/or unexpired tokens were not found, the computing device may retrieve authentication credentials. This may comprise retrieving the credentials from a hashicorp vault. The credentials might be relevant to the authoritative DNS and/or a different authoritative database, such as a Microsoft active directory. This may be the same or similar as step 306 of FIG. 3.

In step 1009, the computing device may determine whether the authentication credentials referenced in step 1008 were retrieved successfully. This may be the same or similar as step 306 of FIG. 3. If not, the method 1000 proceeds to step 1004, where the request is rejected. If so, the computing device proceeds to step 1010.

In step 1010, the computing device may generate a new token against the authoritative DNS server. This step may comprise generating a new token against the authoritative DNS server by causing the authoritative DNS server to query a second authentication server and/or database.

In step 1011, the computing device may determine whether the new token was generated successfully. If so, the method 1000 proceeds to step 1012. Otherwise, the method proceeds to step 1004, where the request is rejected.

In step 1012, the token may be stored. For example, the computing device may save the token for use in future requests to the authoritative DNS server. Then, the method 1000 proceeds to step 1007.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to validate Domain Name System (DNS) requests to avoid typographical errors inadvertently creating DNS zones, the computing device comprising:

one or more processors; and memory storing instructions that, when executed by the one or more processors, cause the computing device to:

receive, via an Application Programming Interface (API), a first request to create a DNS Canonical Name (CNAME) record, wherein the first request comprises:

first authentication credentials corresponding to a first user, wherein the first authentication credentials comprise a first user identifier; and

31 an identification of a requested DNS subzone;

based on determining that the requested DNS subzone corresponds to an existing DNS subzone, based on validating the first authentication credentials, and based on determining that an existing DNS CNAME record corresponding to the existing DNS subzone comprises the first user identifier, transmit the first request to a DNS server;

receive, via the API, a second request to create a DNS CNAME record, wherein the second request comprises:

second authentication credentials corresponding to a second user, wherein the second authentication credentials comprise a second user identifier; and a second identification of the requested DNS subzone; and based on determining that the requested DNS subzone does not correspond to any existing DNS subzones:

identify a typographical error in the second identification by processing, using a natural language processing algorithm, the second identification; and cause, based on the typographical error, display, in a user interface, of a recommended modification to the second request.

2. The computing device of claim 1, wherein the instructions, when executed by the one or more processors, cause the computing device to:

receive, via the API, a third request to create a DNS CNAME record, wherein the third request comprises:

third authentication credentials corresponding to a second user, wherein the third authentication credentials comprise a third user identifier; and a third identification of the requested DNS subzone; and based on determining that the requested DNS subzone corresponds to an existing DNS subzone, based on validating the third authentication credentials, and based on determining that the third user identifier is not indicated in any DNS records associated with the existing DNS subzone:

cause display, in the user interface, of an indication that the third request to create the DNS CNAME record is denied.

3. The computing device of claim 1, wherein the first request comprises a timeToLive value, and wherein the instructions, when executed by the one or more processors, cause the computing device to transmit the first request to the DNS server by causing the computing device to:

modify the timeToLive value based on the requested DNS subzone.

4. The computing device of claim 1, wherein determining that the requested DNS subzone corresponds to an existing DNS subzone comprises:

validating a format of the identification of the requested DNS subzone.

5. The computing device of claim 1, wherein the instructions, when executed by the one or more processors, cause the computing device to transmit the first request to a DNS server by causing the computing device to:

add, to a comment field of the first request, an indication of the first user identifier.

6. The computing device of claim 1, wherein the instructions, when executed by the one or more processors, cause the computing device to transmit the first request to a DNS server by causing the computing device to:

add, to a comment field of the first request, a timestamp corresponding to a time when the computing device received the first request.

7. The computing device of claim 1, wherein the recommended modification to the second request comprises a recommendation to modify one or more characters of the identification of a requested DNS subzone.

8. A method configured to validate Domain Name System (DNS) requests to avoid typographical errors inadvertently creating DNS zones, the method comprising:

receiving, via an Application Programming Interface (API), a first request to create a DNS Canonical Name (CNAME) record, wherein the first request comprises:

first authentication credentials corresponding to a first user, wherein the first authentication credentials comprise a first user identifier; and an identification of a requested DNS subzone;

based on determining that the requested DNS subzone corresponds to an existing DNS subzone, based on validating the first authentication credentials, and based on determining that an existing DNS CNAME record corresponding to the existing DNS subzone comprises the first user identifier, transmitting the first request to a DNS server;

receiving, via the API, a second request to create a DNS CNAME record, wherein the second request comprises:

second authentication credentials corresponding to a second user, wherein the second authentication credentials comprise a second user identifier; and a second identification of the requested DNS subzone; and based on determining that the requested DNS subzone does not correspond to any existing DNS subzones:

identifying a typographical error in the second identification by processing, using a natural language processing algorithm, the second identification; and causing, based on the typographical error, display, in a user interface, of a recommended modification to the second request.

9. The method of claim 8, further comprising:

receiving, via the API, a third request to create a DNS CNAME record, wherein the third request comprises:

third authentication credentials corresponding to a second user, wherein the third authentication credentials comprise a third user identifier; and a third identification of the requested DNS subzone; and based on determining that the requested DNS subzone corresponds to an existing DNS subzone, based on validating the third authentication credentials, and based on determining that the third user identifier is not indicated in any DNS records associated with the existing DNS subzone:

causing display, in the user interface, of an indication that the third request to create the DNS CNAME record is denied.

10. The method of claim 8, wherein the first request comprises a timeToLive value, and wherein the transmitting the first request to the DNS server comprises:

modifying the timeToLive value based on the requested DNS subzone.

11. The method of claim 8, wherein the determining that the requested DNS subzone corresponds to an existing DNS subzone comprises:

validating a format of the identification of the requested DNS subzone.

12. The method of claim 8, wherein the transmitting the first request to a DNS server comprises:

adding, to a comment field of the first request, an indication of the first user identifier.

13. The method of claim 8, wherein the transmitting the first request to a DNS server comprises:

adding, to a comment field of the first request, a timestamp corresponding to a time when the computing device received the first request.

14. The method of claim 8, wherein the recommended modification to the second request comprises a recommendation to modify one or more characters of the identification of a requested DNS subzone.

15. One or more non-transitory computer-readable media storing instructions configured to validate Domain Name System (DNS) requests to avoid typographical errors inadvertently creating DNS zones, wherein the instructions, when executed by one or more processors, cause a computing device to:

receive, via an Application Programming Interface (API), a first request to create a DNS Canonical Name (CNAME) record, wherein the first request comprises:

first authentication credentials corresponding to a first user, wherein the first authentication credentials comprise a first user identifier; and an identification of a requested DNS subzone;

based on determining that the requested DNS subzone corresponds to an existing DNS subzone, based on validating the first authentication credentials, and based on determining that an existing DNS CNAME record corresponding to the existing DNS subzone comprises the first user identifier, transmit the first request to a DNS server;

receive, via the API, a second request to create a DNS CNAME record, wherein the second request comprises:

second authentication credentials corresponding to a second user, wherein the second authentication credentials comprise a second user identifier; and a second identification of the requested DNS subzone; and based on determining that the requested DNS subzone does not correspond to any existing DNS subzones:

identify a typographical error in the second identification by processing, using a natural language processing algorithm, the second identification; and cause, based on the typographical error, display, in a user interface, of a recommended modification to the second request.

16. The one or more non-transitory computer-readable media of claim 15, wherein the instructions, when executed by the one or more processors, cause the computing device to:

receive, via the API, a third request to create a DNS CNAME record, wherein the third request comprises:

third authentication credentials corresponding to a second user, wherein the third authentication credentials comprise a third user identifier; and a third identification of the requested DNS subzone; and based on determining that the requested DNS subzone corresponds to an existing DNS subzone, based on validating the third authentication credentials, and based on determining that the third user identifier is not indicated in any DNS records associated with the existing DNS subzone:

cause display, in the user interface, of an indication that the third request to create the DNS CNAME record is denied.

17. The one or more non-transitory computer-readable media of claim 15, wherein the first request comprises a timeToLive value, and wherein the instructions, when executed by the one or more processors, cause the computing device to transmit the first request to the DNS server by causing the computing device to:

modify the timeToLive value based on the requested DNS subzone.

18. The one or more non-transitory computer-readable media of claim 15, wherein determining that the requested DNS subzone corresponds to an existing DNS subzone comprises:

validating a format of the identification of the requested DNS subzone.

19. The one or more non-transitory computer-readable media of claim 15, wherein the instructions, when executed by the one or more processors, cause the computing device to transmit the first request to a DNS server by causing the computing device to:

add, to a comment field of the first request, an indication of the first user identifier.

20. The one or more non-transitory computer-readable media of claim 15, wherein the instructions, when executed by the one or more processors, cause the computing device to transmit the first request to a DNS server by causing the computing device to:

add, to a comment field of the first request, a timestamp corresponding to a time when the computing device received the first request.

* * * * *